July 9, 1968   A. T. PARRELLA ETAL   3,391,497
ROLL GRINDING AND GAGING APPARATUS
Filed Nov. 17, 1964   13 Sheets-Sheet 1
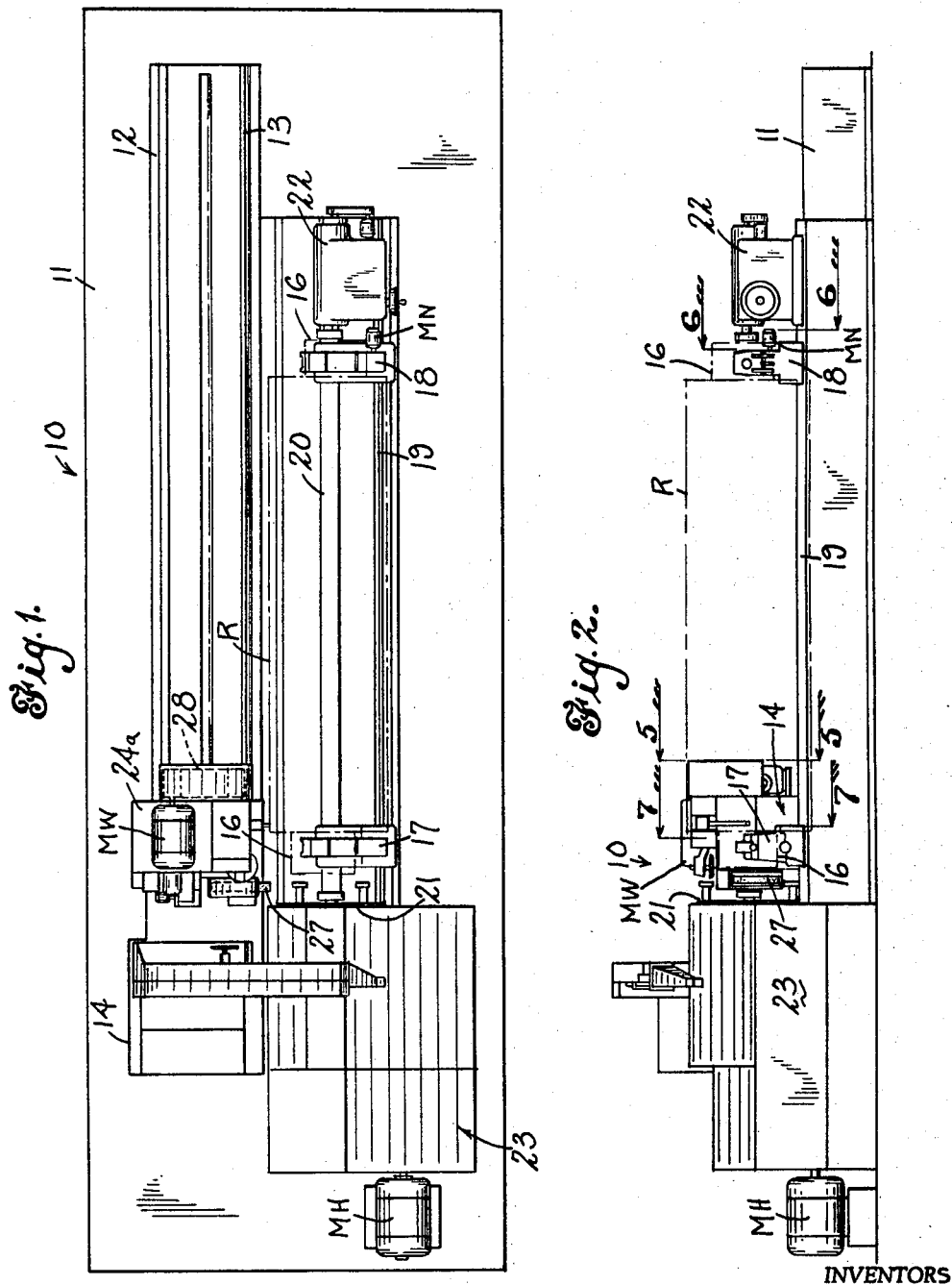
INVENTORS
Alfred T. Parrella
Gene R. Gagliardi
BY Delio and Montgomery
ATTORNEYS

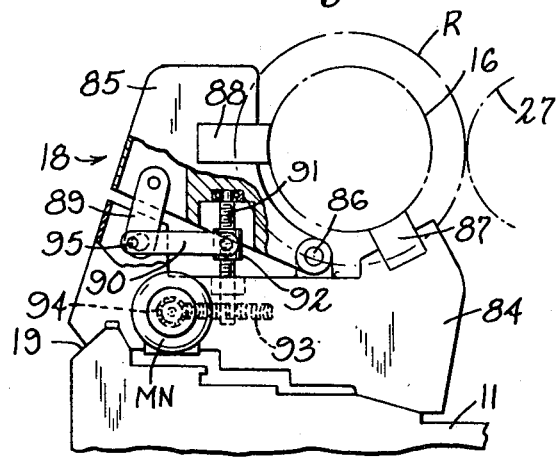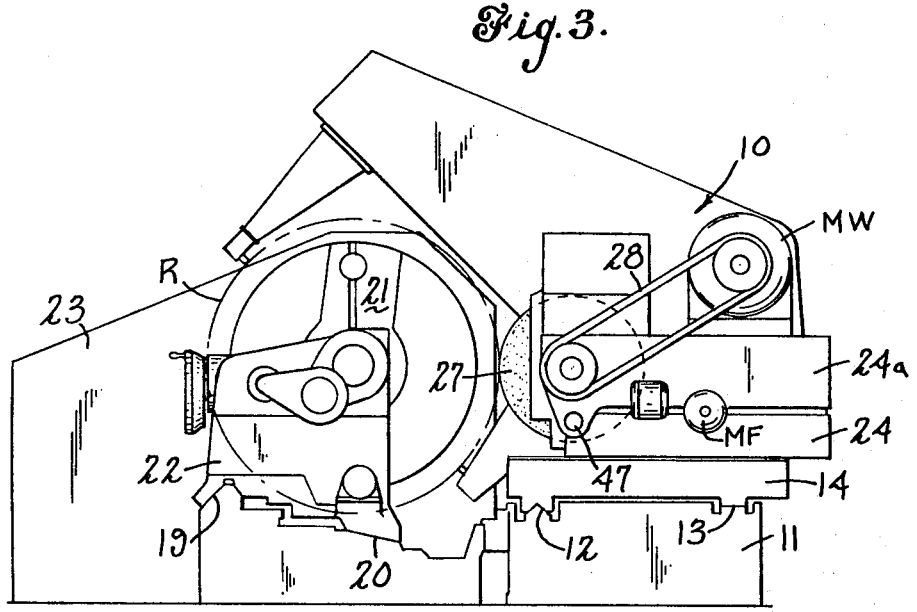

INVENTORS
Alfred T. Parrella
Gene R. Gagliardi
BY Delio and Montgomery
ATTORNEYS July 9, 1968
A. T. PARRELLA ET AL
3,391,497
ROLL GRINDING AND GAGING APPARATUS
Filed Nov. 17, 1964
13 Sheets-Sheet 4
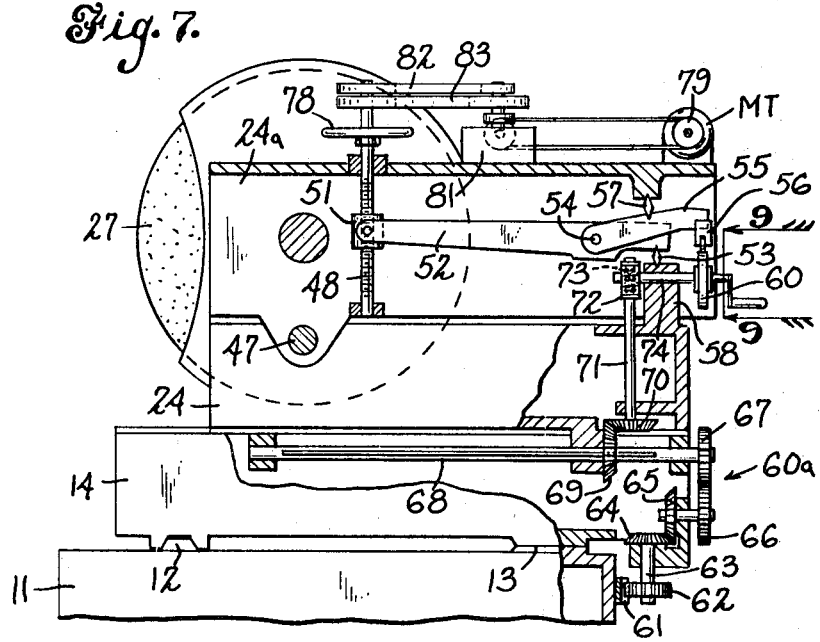
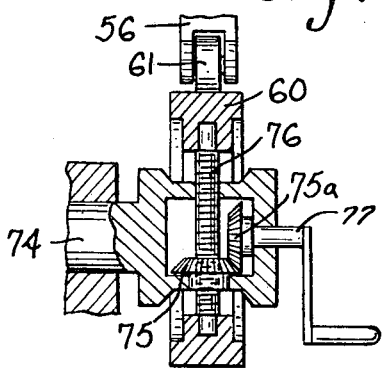
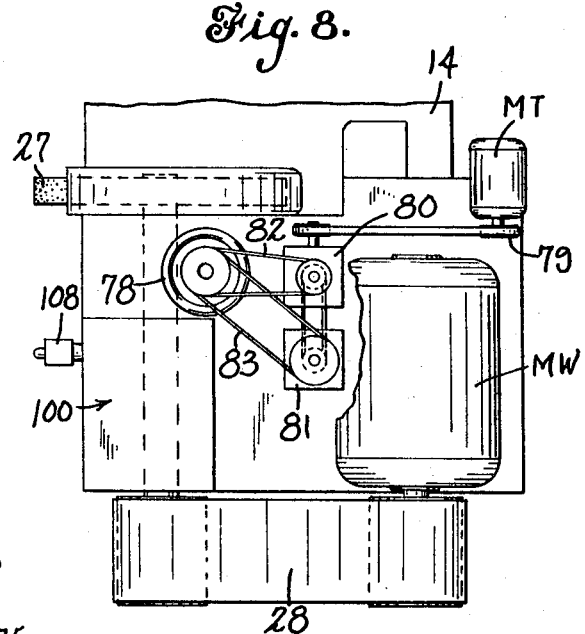
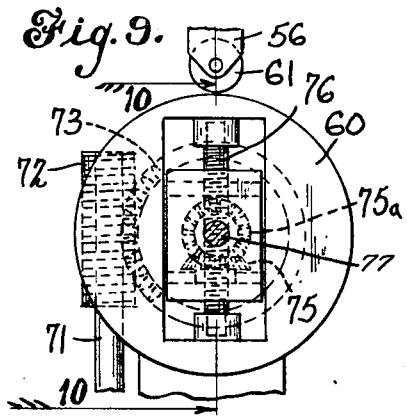
INVENTORS
Alfred T. Parrella
Gene R. Gagliardi
BY Delio and Montgomery
ATTORNEYS

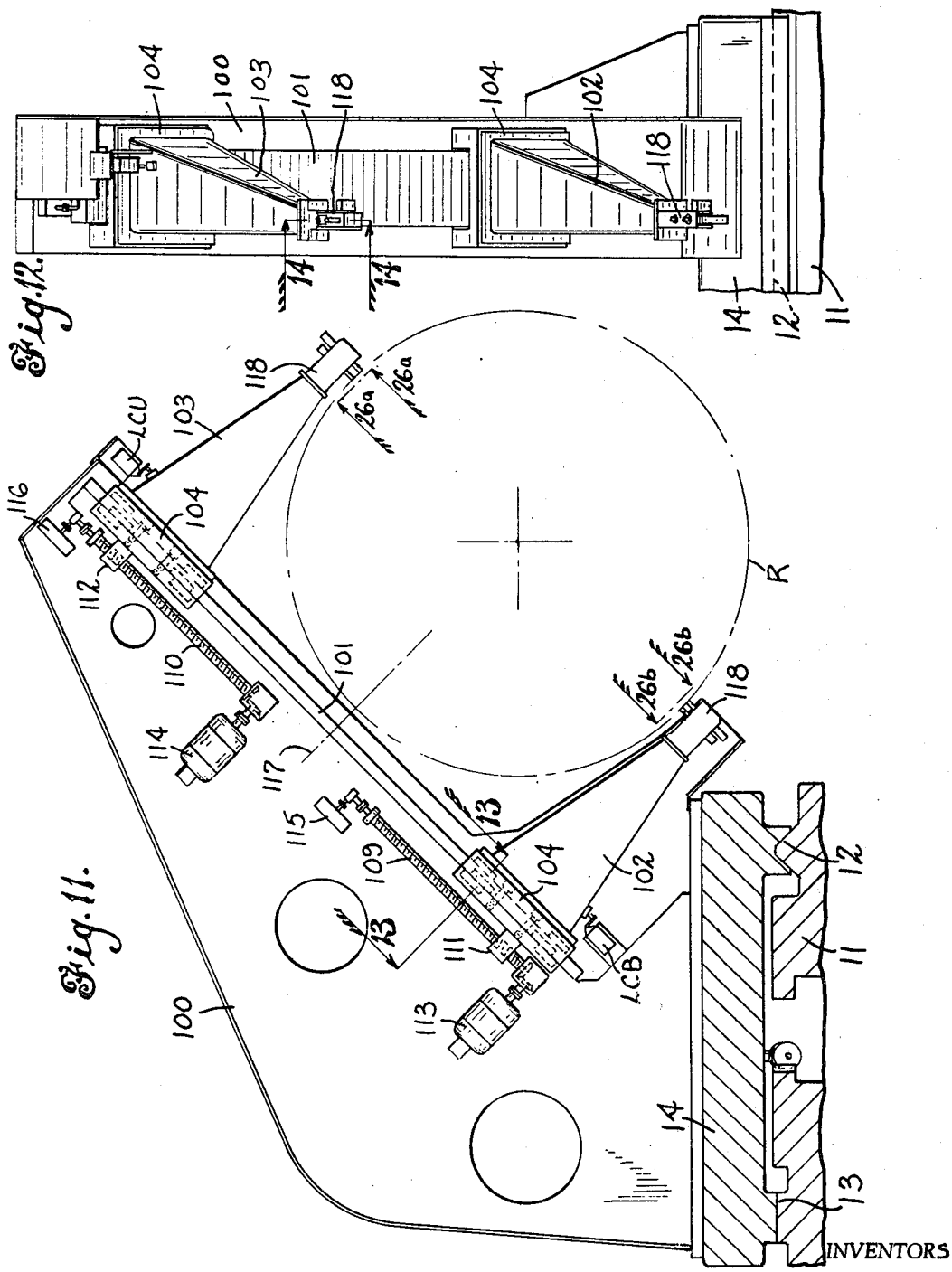

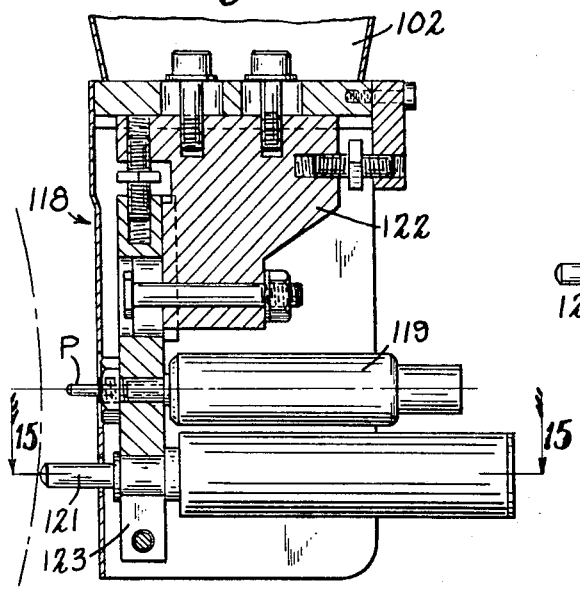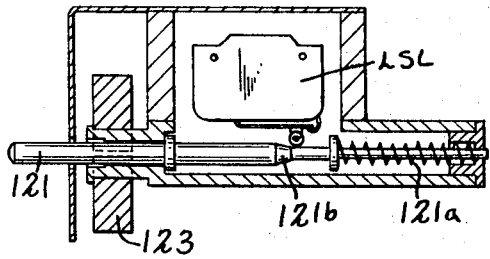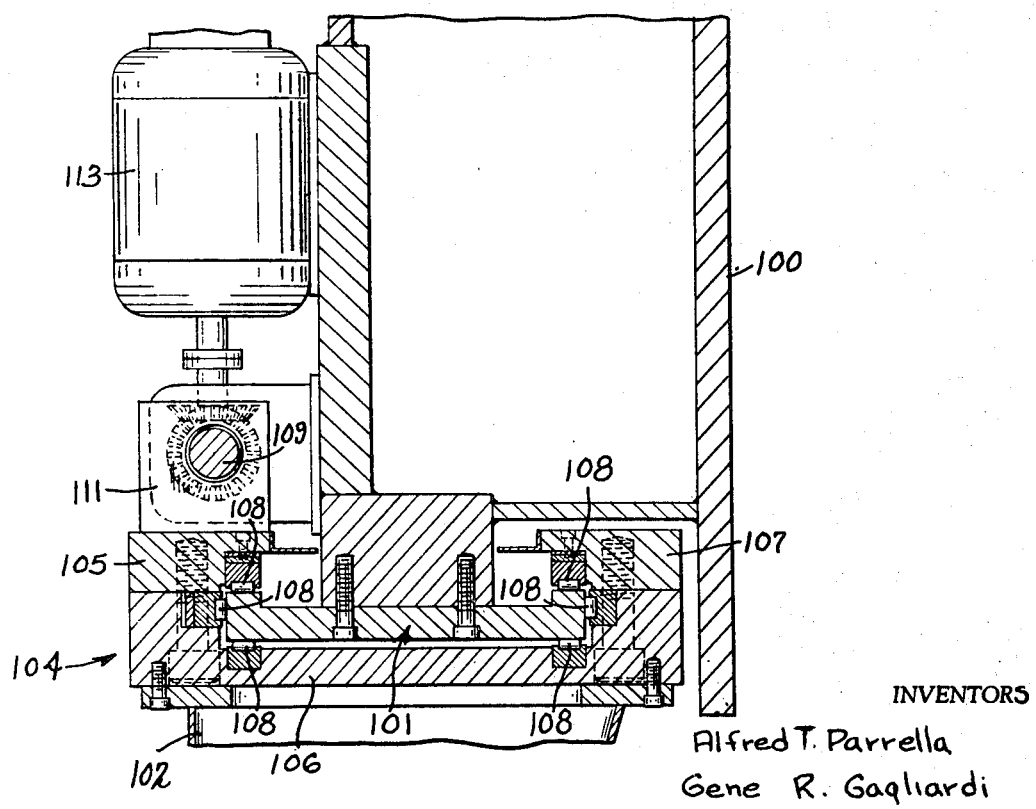

July 9, 1968  A. T. PARRELLA ET AL  3,391,497
ROLL GRINDING AND GAGING APPARATUS
Filed Nov. 17, 1964  13 Sheets-Sheet 9

INVENTORS
Alfred T. Parrella
Gene R. Gagliardi
BY DeLio and Montgomery
ATTORNEYS July 9, 1968   A. T. PARRELLA ETAL   3,391,497
ROLL GRINDING AND GAGING APPARATUS
Filed Nov. 17, 1964

INVENTORS
Alfred T. Parrella
Gene R. Gagliardi
BY
DeLio and Montgomery
ATTORNEYS INVENTORS
Alfred T. Parrella
Gene R. Gagliardi
BY DeLio and Montgomery
ATTORNEYS

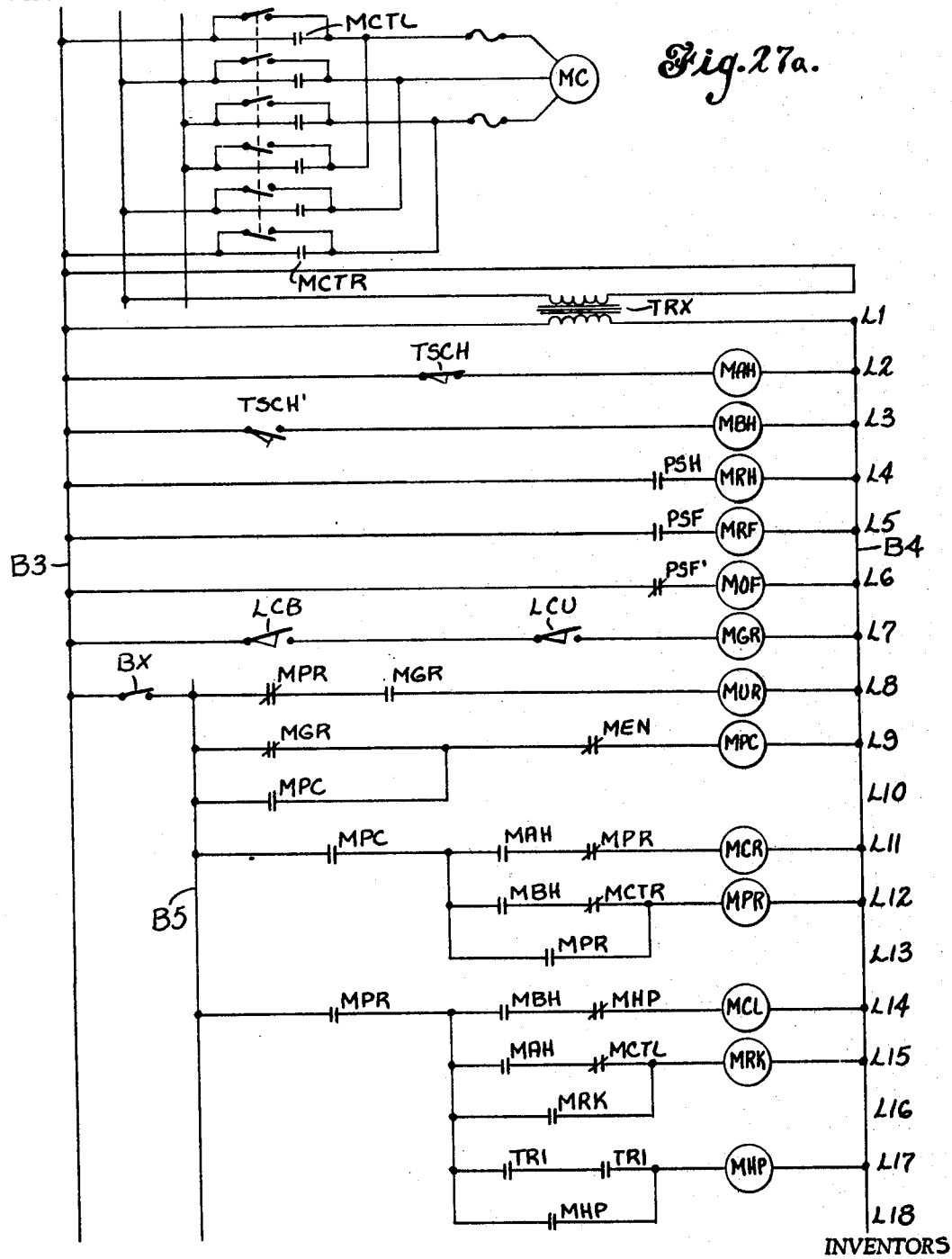

United States Patent Office 3,391,497
Patented July 9, 1968

3,391,497
ROLL GRINDING AND GAGING APPARATUS
Alfred T. Parrella, Newtown, and Gene R. Gagliardi, Bethany, Conn., assignors to Farrel Corporation, Ansonia, Conn.
Filed Nov. 17, 1964, Ser. No. 411,774
33 Claims. (Cl. 51—165)

ABSTRACT OF THE DISCLOSURE

This disclosure relates to roll grinding apparatus including a gaging arm extending across a roll to be ground, where the gaging arm carries gage heads movable along a common axis to engage and detect the surfaces of a roll at essentially diametrically opposite points. The gage heads may be utilized to measure roll diameter, effect axial alignment of the roll, measure the contour of the roll along the length thereof and provide a mechanism for a process of roll axis alignment.

---

This invention relates to grinding, and more particularly relates to grinding of mill rolls.

Apparatus for grinding mill rolls generally comprises a means in the form of neck rests or journal supports for rotatably supporting a roll to be ground, and a carriage means movable on ways along the length of the roll. The carriage carries thereon a grinding wheel assembly on a sub-carriage which is movable toward and away from the face of the roll to position the grinding wheel with respect to the roll.

During usage a mill roll will experience wear along and across the face thereof, and periodically such rolls must be reground to a predetermined shape or contour. When a roll is to be reground, it must be mounted in a grinding machine, and various measurements made of the roll to determine what wear the roll has experienced, the amount of metal that must be removed, etc. to restore the roll to its original shape. Additionally, when the roll is mounted in the grinding machine, its axis will, in most cases, not be aligned with the path of travel of the grinding wheel carriage. Therefore, the degree of misalignment must be detected and the roll repositioned to correct such misalignment. After the roll has been reground, it is desirable to determine various characteristics thereof for record purposes and for quality control purposes to insure that all rolls of a given class have the same characteristics, within given tolerances.

This invention provides new and improved means mounted on the grinding wheel carriage of a roll grinder in a more compact and efficient arrangement for performing roll gaging and measuring functions. The invention provides new and improved structural and operative means, and techniques for effecting measurement of roll diameter, measuring and recording roll face contour, and accomplishing roll axis alignment. More specifically, the present invention provides new and improved means for measuring the diameter and shape of a roll, new and improved means for aligning the axis of the roll with a reference line of the grinding apparatus, and new and improved means for measuring and recording the dimensions of a finished ground roll and the shape thereof.

Apparatus embodying the invention may be operated automatically or through programmed electronic controls to perform a grinding operational cycle on a mill roll. Apparatus embodying the invention may also be controlled by an operator or attendant to perform a complete grinding cycle. To facilitate presentation of the features of the invention, disclosure of a grinding apparatus embodying the invention will be made for the most part under the assumption that the operator initiates the various functions of the grinding apparatus.

An object of this invention is to provide new and improved roll grinding apparatus.

Another object of this invention is to provide roll grinding apparatus including new and improved means for measuring and indicating dimensional characteristics of a mill roll mounted thereon.

Another object of this invention is to provide roll grinding apparatus including new and improved roll measuring and gaging means mounted on the grinding wheel carriage and arranged to move along the length of a mill roll and measure and indicate dimensional characteristics of the roll along the length thereof.

Another object of this invention is to provide roll grinding apparatus having new and improved means for detecting misalignment of the axis of a roll thereon and automatically repositioning such roll to accurately align the axis of the roll with a reference line defined by the grinding apparatus.

Another object of this invention is to provide roll grinding apparatus having new and improved means for detecting and indicating the longitudinal contour of a roll thereon.

A further object of this invention is to provide roll grinding apparatus having new and improved means for detecting and recording dimensional characteristics of a roll thereon.

A still further object of this invention is to provide new and improved means for aligning the axis of a mill roll with a reference line of a grinding machine upon which the roll is to be ground.

The novel features of the invention are pointed out with particularity and distinctly claimed in the concluding portion of this specification. The invention, however, both as to operation and organization, together with further objects and advantages thereof, may best be appreciated by reference to the following detailed description taken in conjunction with the drawings wherein:

FIG. 1 is a plan view of roll grinding apparatus embodying the features of the present invention;

FIG. 2 is a front elevation of the machine of FIG. 1;

FIG. 3 is an end view of the apparatus of FIGS. 1 and 2 as viewed from the right side;

FIG. 6 is a view seen along line 6—6 of FIG. 2 with a portion thereof broken away to facilitate illustration of an adjustable roll supporting means;

FIG. 7 is a view in section seen along line 7—7 of FIG. 2;

FIG. 8 is a plan view of the apparatus shown in FIG. 7;

FIG. 9 is a view seen along line 9—9 of FIG. 7;

FIG. 10 is a view seen along line 10—10 of FIG. 9;

FIG. 11 is an enlarged side elevation of a caliper-like structure mounted on the grinding wheel carriage;

FIG. 12 is a front elevation of the structure of FIG. 11;

FIG. 13 is a sectional view seen along line 13—13 of FIG. 11;

FIG. 14 is a sectional view seen along line 14—14 of FIG. 12;

FIG. 15 is a sectional view seen along line 15—15 of FIG. 14.

Figure 16:
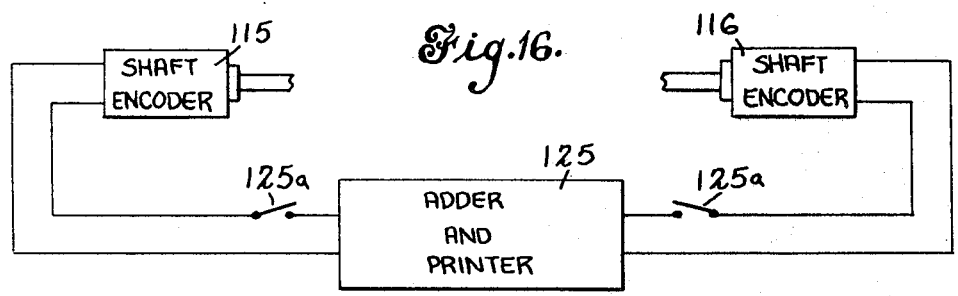
Figure 17:
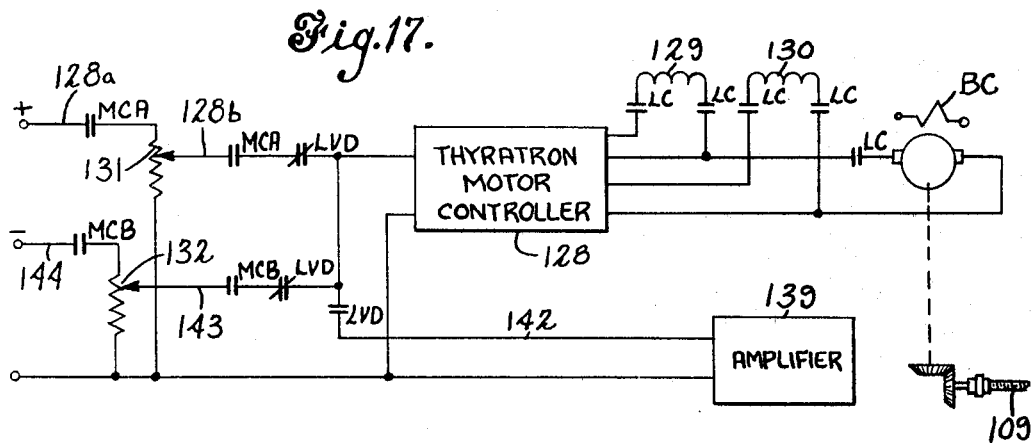
Figure 18:
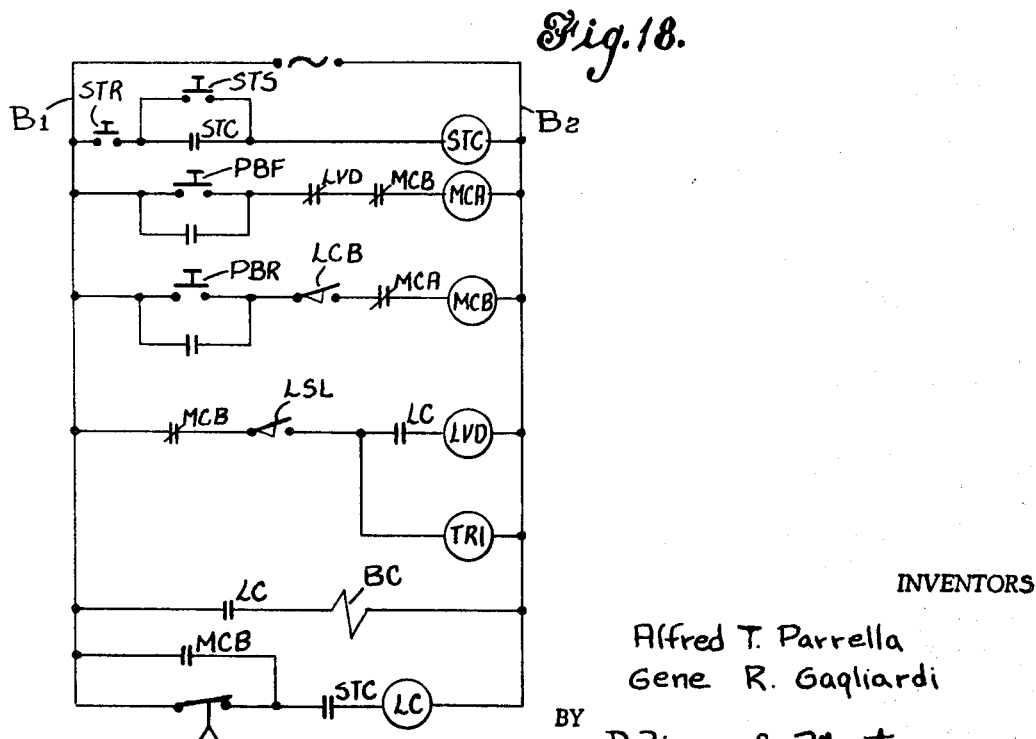
Figure 19:
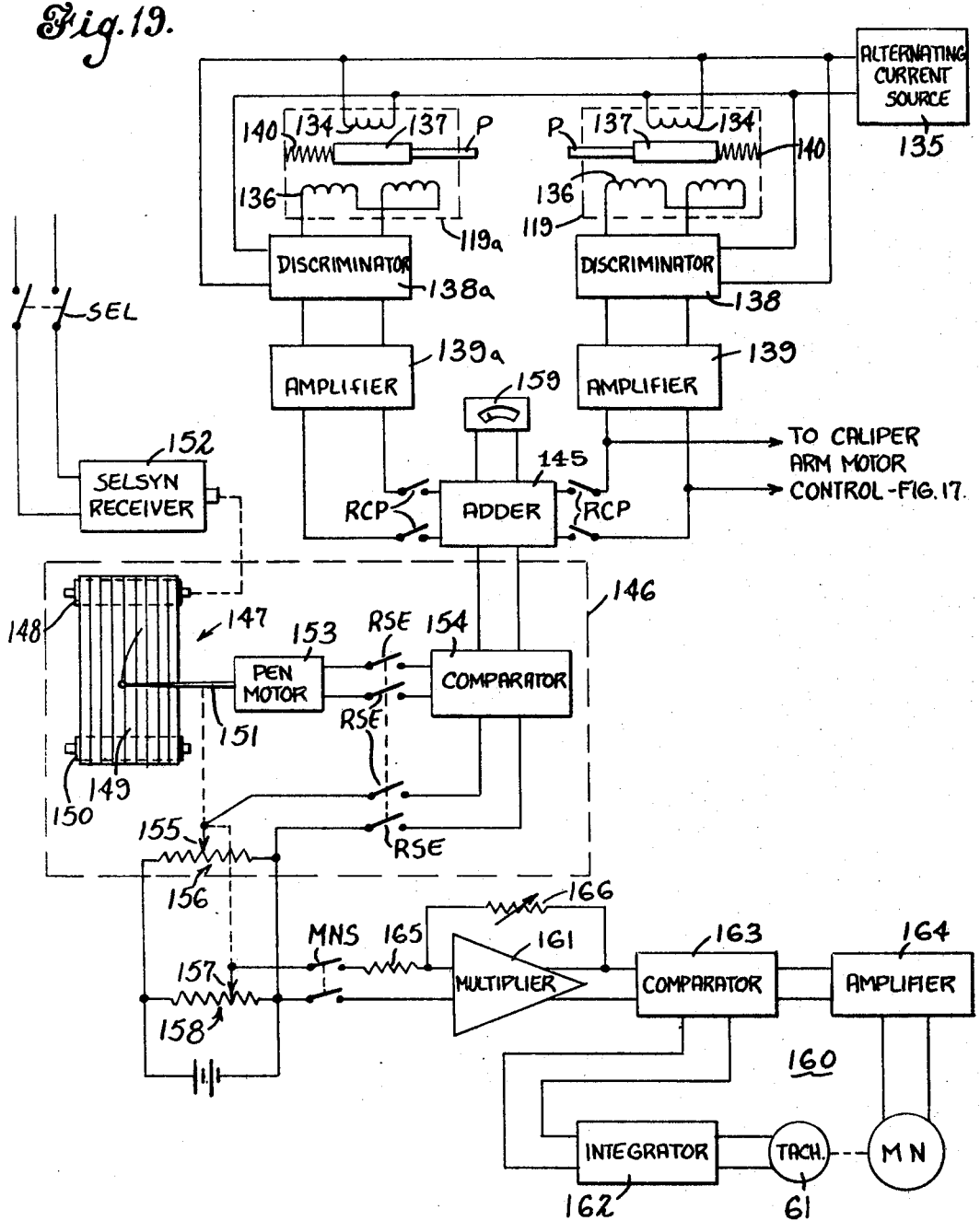
Figure 20:
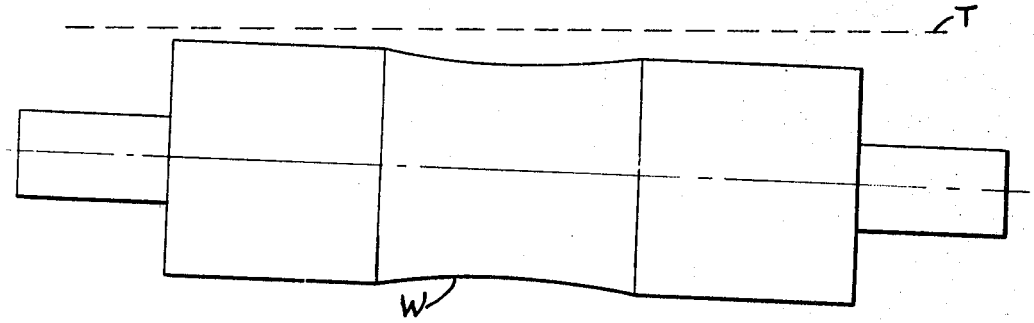
Figure 21:
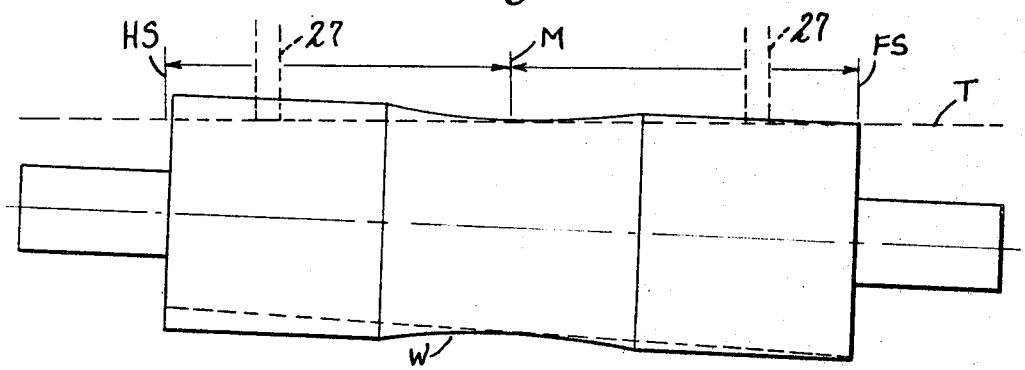
Figure 22:
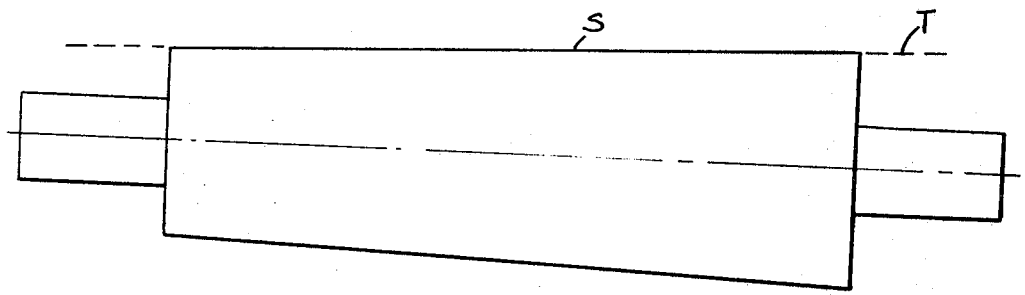
Figure 23:
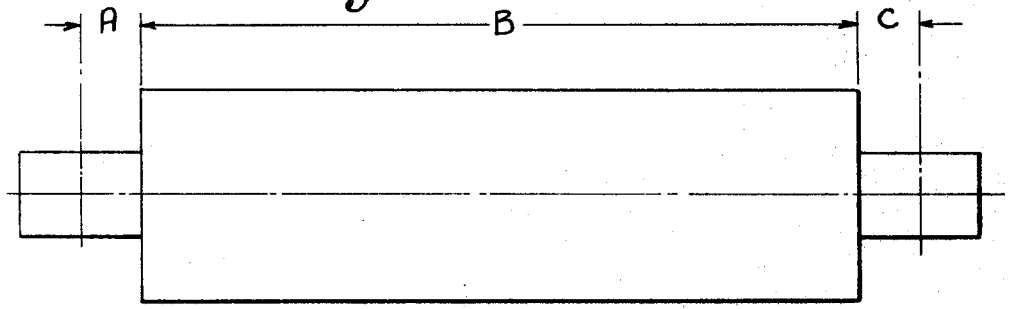
Figure 24:
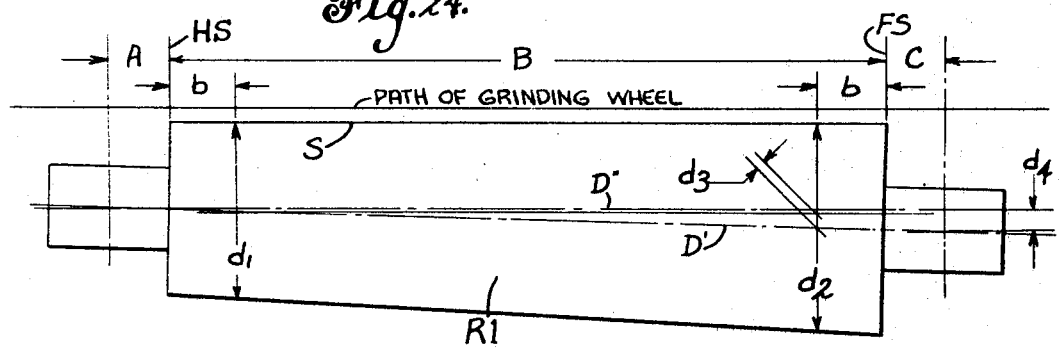
Figure 28:
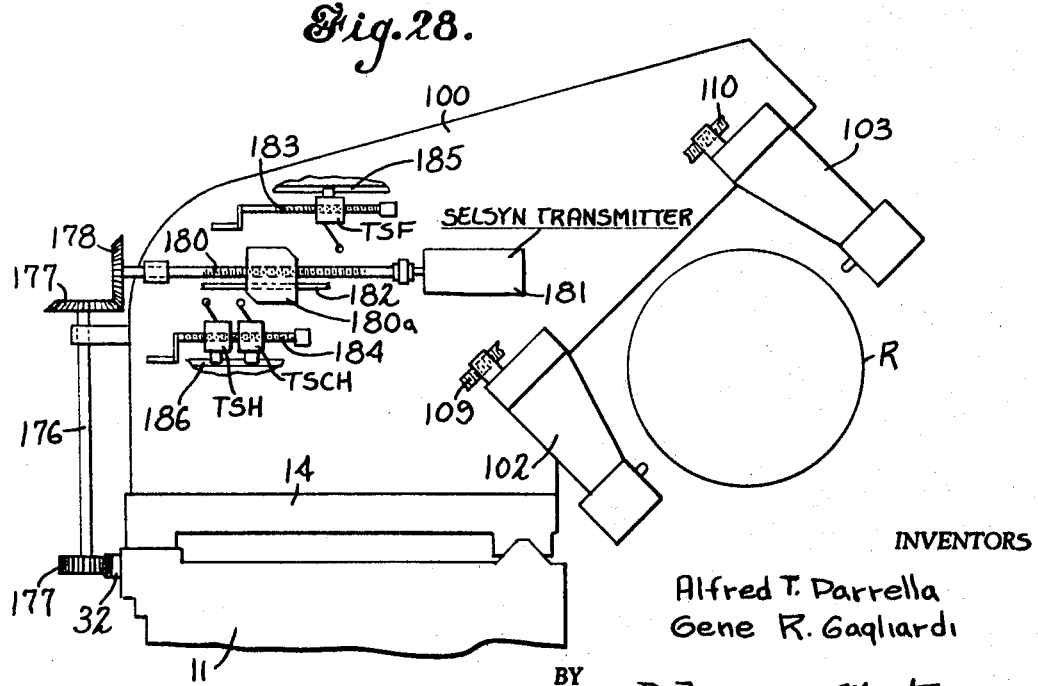
Figure 25:
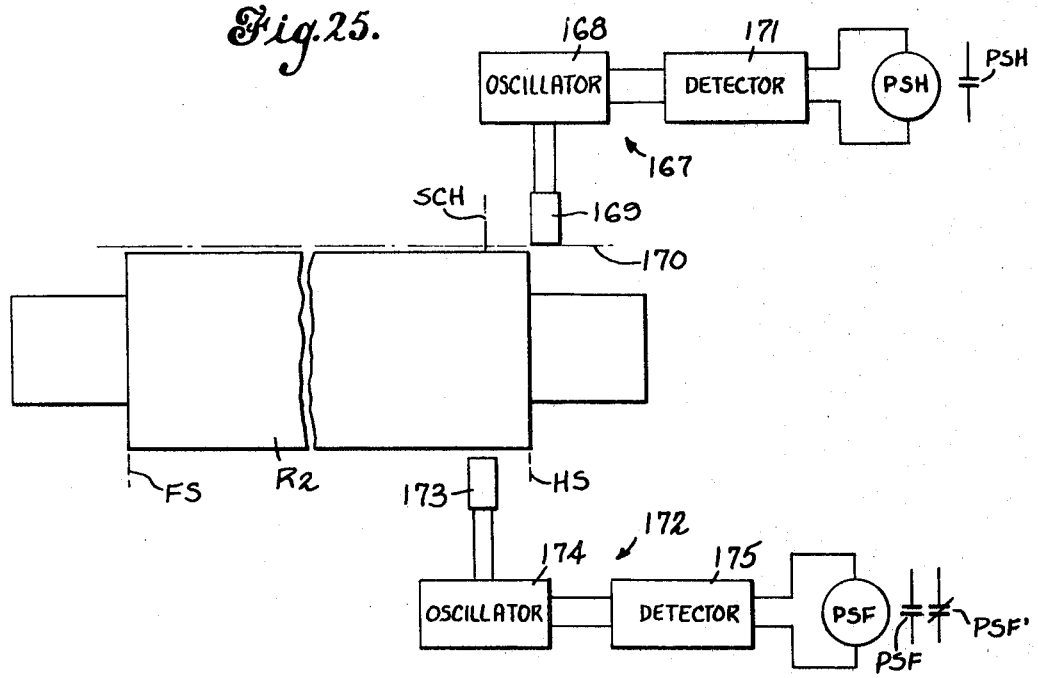
Figure 26A:
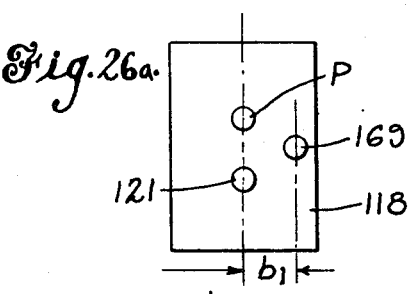
Figure 26B:
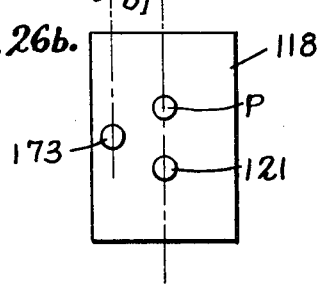
Figure 27B:
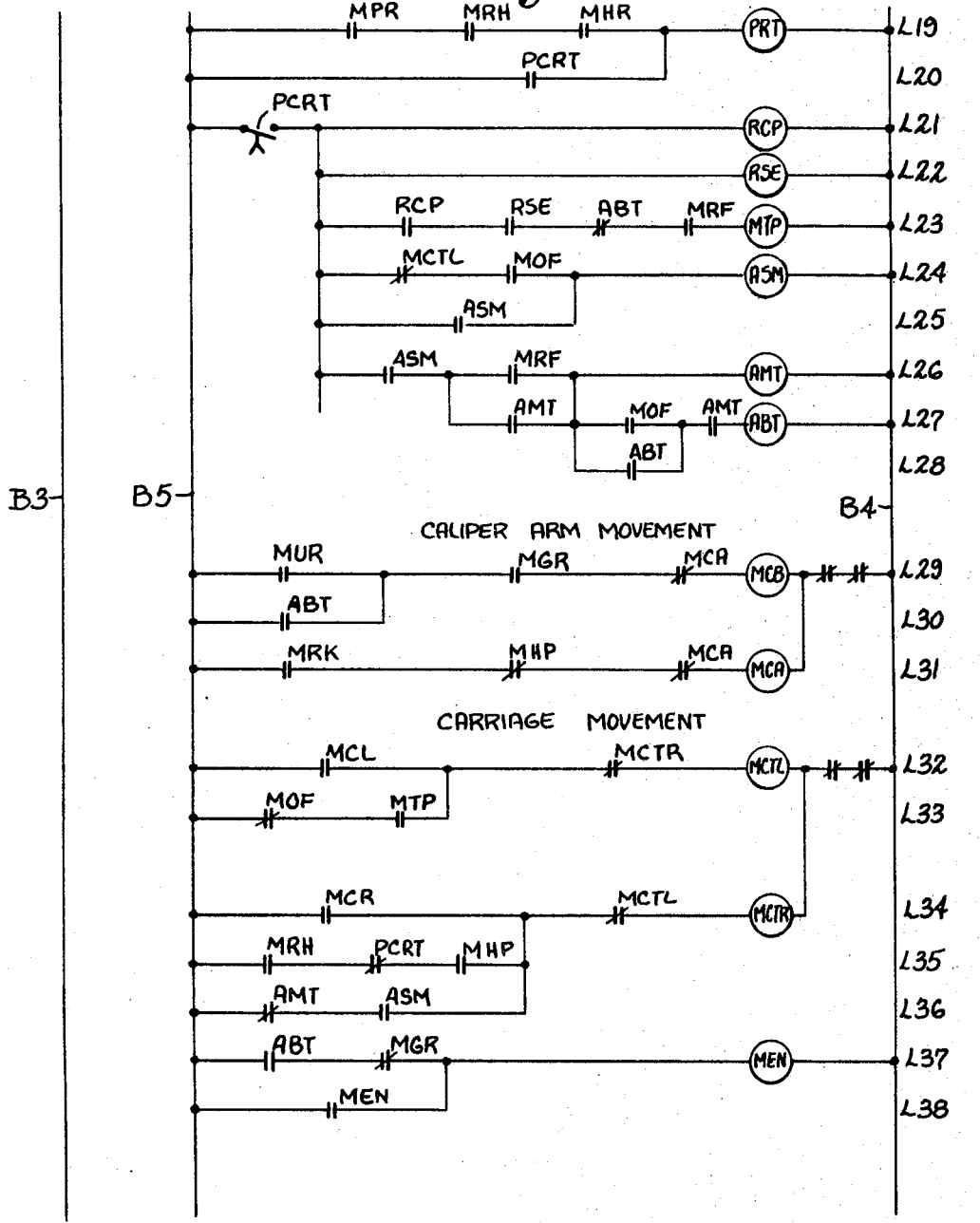

FIG. 16 diagrammatically illustrates an arrangement for measuring and recording the diameter of a roll;

FIG. 17 is a schematic diagram, partially in block form of a drive system for moving arms on the structure of FIGS. 11 and 12;

FIG. 18 is a schematic diagram of a circuit for operating the drive system of FIG. 17;

FIG. 19 is a diagram partly schematic and partly in block form which illustrates arrangements for detecting the surface of a roll, recording the contour thereof, and aligning the axis of a roll;

FIGS. 20, 21 and 22 are diagrammatic illustrations of a roll which exemplify the position of a roll when it is first placed on a grinding machine and rough ground to align one side of the roll parallel to the path of travel of a grinding wheel;

FIGS. 23 and 24 are diagrammatic illustrations of a roll set forth to exemplify the geometry thereof and explain the manner in which the degree of misalignment of a roll is detected;

FIG. 25 is a diagram in block form of proximity detectors which sense the ends of the faces of a roll;

FIGS. 26a and 26b are views seen along lines 26a—26a and 26b—26b, respectively, of FIG. 11, and illustrate the cooperative relationship of the proximity detectors of FIG. 25;

FIGS. 27a and 27b are schematic diagrams of control and logic circuitry for automatically aligning the axis of a roll and for plotting and recording the contour of a roll; and FIG. 28 is an elevation of a caliper-like structure similar to FIG. 11, but further showing the operation relationship of carriage position sensing elements which may conveniently be carried thereon.

The overall arrangement of grinding apparatus embodying the features of the invention and upon which the invention may be practiced is generally illustrated in FIGS. 1–10. Grinding apparatus generally indicated by the referenced numeral 10 comprises a bed or frame member 11 having parallel ways 12 and 13 provided thereon. A carriage 14 is movable along the length of ways 12 and 13. A mill roll R, indicated in broken line, may have its journals or necks 16 supported by neck rests 17 and 18. Neck rests 17 and 18 are longitudinally positionable on ways 19 and 20, FIG. 3, parallel to ways 12 and 13.

Roll R is initially mounted on neck rests 17 and 18 and between headstock 21 and footstock 22, respectively. The mill roll is chucked to the headstock by suitable dogs or driving clamps (not shown) and is rotatably driven by headstock motor MH through suitable reduction means indicated by the reference numeral 23. As hereinafter more fully described, neck rest 18 includes adjusting means adapted to move a roll neck supported thereon transversely of ways 19 and 20. Mounted on carriage 14 is a sub-carriage 24 movable on ways 25 and 26 (FIG. 4) perpendicular to ways 12 and 13. Sub-base 24 includes a grinding head 24a carrying thereon a grinding wheel 27. Grinding wheel 27 is driven by grinding wheel motor MW through endless belt 28.

Figure 4:
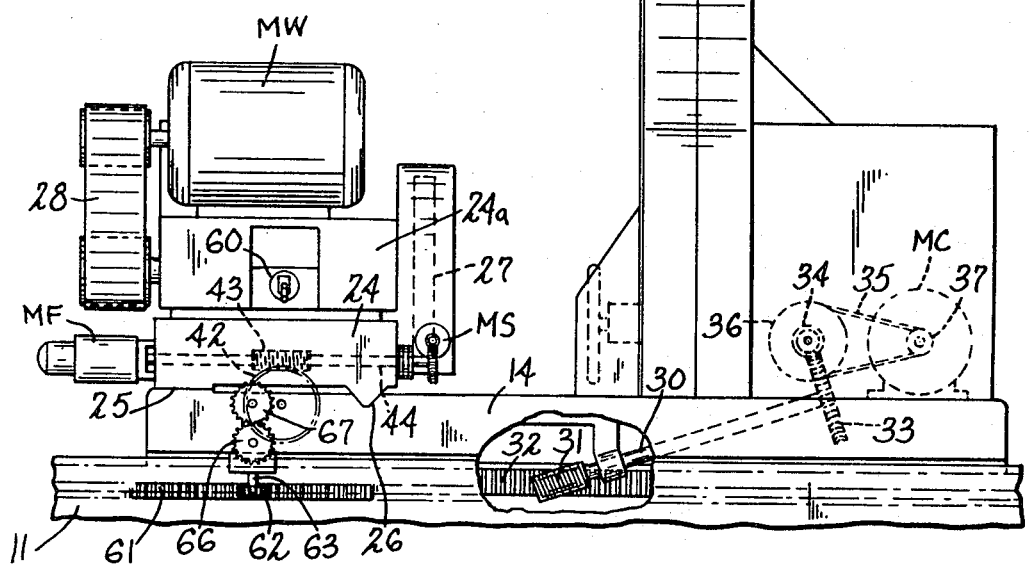
FIG. 4 is an enlarged rear elevation of a portion of the apparatus of FIG. 1, with a portion broken away to show a means for moving the grinding head along the length of a roll to be ground.
Figure 5:
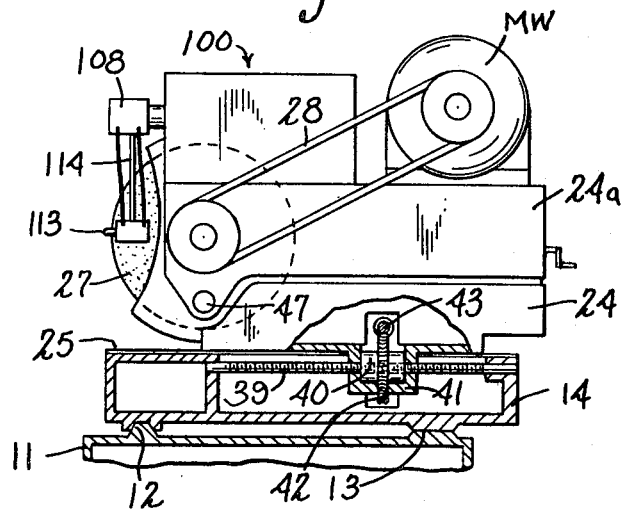
FIG. 5 is a view, partly in section, seen along line 5—5 of FIG. 2.

Carriage 14 is driven along ways 12 and 13 by motor MC, FIG. 4. A drive shaft 30 is rotatably supported on carriage 14 and carries at one end thereof a worm gear 31 which drivingly engages a rack 32 extending along bed 11. The other end of drive shaft 30 has a worm wheel 33 thereon drivably engaged by a worm gear 34. Worm gear 34 is driven from motor MC through belt 35 about pulleys 36 and 37. Carriage 14 is driven in either direction along ways 12 and 13 by motor MC, which may be reversibly operated.

Sub-carriage 24 is movable on ways 25 and 26 defined on carriage 14 transversely to ways 12 and 13. Sub-carriage 24 is driven by a lead screw 39 (FIG. 5) rotatably mounted within carriage 14. A traveling nut 40 is carried in housing portion 41 of sub-carriage 24. A gear 42 is secured to nut 40 and is driven by a worm 43 on a shaft 44, (FIG. 4). Shaft 44 is driven by either a fast infeed motor MF or a slow infeed motor MS. In practice, sub-carriage 24 is advanced towards a mill roll R at a first fast infeed speed until it is a predetermined distance from the roll and then it is advanced at a second or slow infeed speed until it is almost in contact with the roll at which time the grinding wheel is tilted toward the roll.

When either motor MF or MS drives shaft 44, worm 43 thereon drives gear 42, which turns nut 41, which in turn produces movement of sub-carriage 24 along ways 25 and 26. It will, of course, be understood that movement of sub-carriage 24 along ways 25 and 26 is reversible. For extremely precise control of grinding wheel infeed, the grinding head 24a is pivotal about pin 47 carried in sub-carriage 24.

A mechanism for tilting grinding head 24a, and hence moving grinding wheel 27 into contact with roll R, is disclosed in Patent 3,088,250, which is incorporated herein by reference.

As thus far described, the grinding machine 10 is arranged to have grinding wheel 27 move along the length of a roll R, and move toward and away from the roll. Means are also provided to move the grinding wheel along a predetermined path corresponding to a given crown for a roll. This arrangement allows a roll to be ground with a predetermined concave or convex contour along the length thereof.

Tilting movement of grinding head 24a about pin 47 is accomplished through rotation of lead screw 48. Lead screw 48 is driven in a manner hereinafter described. When lead screw 48 is rotated, dependent upon the direction of rotation, nut 51 will move thereon. When nut 51 runs up lead screw 48 it raises a lever 52 and causes it to pivot in a clockwise direction as viewed in FIG. 7 about a knife edge 53. This produces similar motion of pin 54 and rotates lever 55 about its support on a carrier 56. Lever 55 then exerts an upwardly directed force on knife edge 57. Knife edge 57 reacts against grinding wheel head 24a while knife edge 53 reacts against upstanding portion 58 from sub-base 24. As lever 55 rotates in a clockwise direction it will tilt head 24a about pin 47 and move grinding wheel 27 toward a roll. From the foregoing, it will be apparent that as nut 51 runs down lead screw 48, reverse action to that described will take place.

In some cases it may be desired to grind a crown, either convex or concave onto the roll. Lever 55 may be operated automatically by offsetting an eccentrically adjustable circular ring or cam 60. The degree of crown is selected by the operator.

The position of a circular cam 60 is selected in accordance with the desired crown. A follower 61 rides on the periphery of cam 60 and supports thereon lever 55 on lever carrier 56. Thus, as cam 60 is rotated, follower 61 may move upwardly and downwardly and operate lever 55 and grinding head 24a.

Cam 60 is arranged to be operated upon movement of carriage 14 along bed 11 by a gear train, generally indicated by the reference numeral 60a. A rack 61 is defined along bed 11. A gear 62 on a shaft 63, rotatably carried by carriage 14, is driven by rack 61 as carriage 14 moves along bed 11. Shaft 63, through bevel gears 64 and 65, drives gear 66, which in turn drives gear 67 on shaft 68. Shaft 68, through bevel gears 69 and 70, drives shaft 71 and worm 72 thereon. Worm 72 drives a gear 73 and shaft 74, which rotates cam 60.

Cam 60 is initially offset about its rotative axis by means of bevel gears 75 and 75a (FIG. 10). When bevel gear 75a is rotated it drives bevel gear 75. Bevel gear 75 drives a cam offsetting screw shaft 76, which adjusts the position of cam 60 with respect to shaft 74.

Thus, the degree of offset of the geometric center of cam 60 with respect to the axis of shaft 74 determines the crown that will be ground onto a roll. It is apparent that if the axis of shaft 74 coincides with the geometric center of cam 60, the above-described crowning mechanism is ineffective.

The operator may set the degree of curvature by manipulating shaft 77 and bevel gear 75a to adjust the center of cam 60 with respect to shaft 74. Alternatively, bevel gear 75a may be operated by power means (not shown) from a remote station as disclosed in U.S. Patent 3,088,250. A crown adjustment, as herein illustrated, is more fully disclosed and claimed in U.S. Patent 2,814,914.

Grinding wheel 27 may be tilted into roll R by means of a handwheel 78 on the lead screw shaft, or lead screw 48 may be driven by motor MT. Motor MT drives a pulley 79 which in turn drives a slow tilt infeed clutch 80 and a fast tilt infeed clutch 81. Clutches 80 and 81 are electromagnetically actuated, and either through belts 82 and 83, respectively, may drive lead screw 48, as shown in FIG. 8.

Neck rest 18 at the footstock end of the machine is arranged to move the neck 16 supported thereon toward and away from grinding wheel 27, and hence move the roll about its center point of support on neck rest 17. Neck rest 18 (FIG. 6) comprises a base portion 84 and a movable arm portion 85 pivoted to base portion 84 at 86. Carried in base portion 84 is a roll neck bearing block 87, and carried in arm portion 85 is a roll neck bearing block 88. Arm portion 85 is pivotally movable with respect to base portion 84 through levers 89 and 90, actuated by lead screw 91 which has a traveling nut 92 thereon. Lead screw 91 has at one end thereof a gear 93 drivingly engaged by a pinion 94 on the shaft of neck rest motor MN. When motor MN is operated pinion 94 drives gear 93 which in turn rotates lead screw 91, and traveling nut 92 moves up or down on lead screw 91. Lever 90 is moved up or down with traveling nut 92 and rotates an eccentric shaft 95 to which it is keyed. Rotation of eccentric shaft 95 then moves levers 89 (only one shown) upwardly or downwardly and in so doing moves arm 85 with bearing block 88 therein toward or away from grinding wheel 27.

In this manner, the position of the footstock neck rest, and hence the roll neck thereon, is adjusted for purposes of aligning the roll with a reference line or axis of the grinding machine, as will hereinafter be more fully described. To measure the degree of movement of a roll neck transversely of the axis of the headstock or the aforementioned reference line a tachometer generator 61 is coupled to the shaft of motor MN.

In accordance with one aspect of the invention, a roll measuring and gaging means is mounted on the grinding wheel carriage, a predetermined distance from grinding wheel 27, for movement along the length of the roll with the carriage. Rigidly mounted on carriage 14 is a caliper-like structure 100, FIGS. 11 and 12. Structure 100 carries thereon guide means in the form of a track 101. Track 101 extends toward the axis of rotation of the headstock and at an acute angle thereto which insures that the track will clear a roll R of a known maximum diameter. A pair of caliper-like measuring or gaging arms 102 and 103 are controllably movable on track 101. As hereinafter described, each of arms 102 and 103 carry measuring and gaging means.

Track 101 is bolted to the main frame of structure 100 and in the illustrated embodiment, FIG. 13, is of generally shallow U-shape. Each of the arm members 102 and 103 as exemplified by arm 102, FIG. 13, is provided with a track-engaging member generally indicated at 104. In the illustrated embodiment, the track-engaging member 104 comprises a plurality of elements 105, 106 and 107 secured together to define the member 104. Member 104 is guidably mounted to track 101 by bearing means. As illustrated, the bearing means comprise six longitudinally extending roller bearing assemblies 108. The bearing assemblies 108 each comprise a guide or race having a plurality of roller bearing elements therein which engage track 101 on six surfaces thereof. This arrangement insures that member 104 will move freely on track 101 with little or no play therebetween. By virtue of this construction the arms 102 and 103 move almost frictionlessly on track 101.

Arms 102 and 103 are independently driven along track 101 by lead screws 109 and 110, respectively, each of which threadably engages a traveling nut 111 and 112, respectively, carried on the members 104 of each arm. Lead screws 109 and 110 are driven by motors 113 and 114, respectively, mounted on structure 100. As will hereinafter be explained, motors 113 and 114 have integral shaft brakes.

Coupled to each of the lead screw shafts are shaft encoders 115 and 116, respectively. The shaft encoders 115 and 116, as will hereinafter be more fully described, emit a signal which is indicative of the position of the traveling nuts 111 and 112, and hence arms 102 and 103 on track 101. In the fully extended position, as exemplified in FIG. 11, the shaft encoders emit a maximum signal indicative of the fully extended distance of the arm 102 and 103 from the mid-point 117 of track 101. Then as arms 102 and 103 move toward point 117, the signals from the shaft encoders decrease with such movement and thus always emit a signal indicative of the distance of arms, and hence the gaging means carried thereby from the mid-point 117.

Carried on each of arms 102 and 103 is a measuring and gaging head 118. Each of the heads 118 carries a measuring means adapted to emit a signal indicative of its proximity to the surface of the roll. In a preferred form, such means is a linear variable differential transformer (LVDT) 119 together with associated circuitry hereinafter described. Each of heads 118 also carries a roll proximity detector in the form of a limit switch LSL actuated by a roll-engaging plunger P. Each head 118 comprises a mounting plate 122 secured to an associated arm and a bracket 123 which carries both a LVDT 119 and a proximity-detecting switch (only one shown).

When plunger P is depressed a predetermined distance against the bias of spring 121a an actuating arm of switch LSL rides up on tapered portion 121b of plunger P and actuates switch LSL. Actuation of switch LSL signifies when LVDT 119 is within a predetermined distance of the surface of roll R, as will hereinafter be described.

Shaft encoders 115 and 116, which emit a signal indicative of the distance of the gaging heads from mid-point 117, are arranged to read the diameter of a roll, even though the roll may be off-center with respect to the axis of rotation of the headstock. Both of arms 102 and 103 are independently actuated, but are operated simultaneously. The arms are moved in until the LVDT's are in a predetermined position with respect to the roll, at which time a read command may be given to the shaft encoders through a roll diameter readout device 125, upon closing of switches 125a, FIG. 16. The readout device 125 may visually indicate the distances indicated by the shaft encoders 115 and 116 or it may be arranged to print the dimension between the LVDT's.

A suitable adding and printing readout device is a parallel entry adding machine and printer manufactured by the Clary Corporation of San Gabriel, Calif., Model No. 1900. Shaft encoders are known in the art and readily available. A suitable model for the purposes herein described is a Coleman Electronic Systems, Inc. "Digitizer," Model C5DT.

In operation, as the arms 102 and 103 move inward on track 101, the shaft encoders emit a signal which is continuously indicative of the distance of the LVDT's carried by each arm from mid-point 117. Therefore, at any instant the signal emitted by a shaft encoder is a measure of the distance of its associated LVDT from mid-point 117. When each LVDT 119 of arms 102 and 103 has been brought into a predetermined position with respect to the surface of a roll therebetween the sum of the signals emitted by the shaft encoders is a measure of the diameter of the rolls.

Arms 102 and 103 are independently, but simultaneously movable on track 101. This arrangement eliminates small variations in measuring which might otherwise result from minor distortion of the frame because of temperature differentials and other possible adverse operating conditions encountered in the operation of large machine tools. The beam-like structure 100 is made rigid and entirely self-supporting to avoid placing any load upon the roll. Moreover, the structure being on the carriage side of the roll, and on the carriage itself does not interfere with placement of a roll on the grinding machine. In practice, the caliper structure is utilized to gage dimensions to 0.0001″ and cannot use the roll as a support. Therefore, the caliper structure is mounted on the heavy stable roll grinder carriage.

Reference is now made to FIGS. 17 and 18 for explanation of the control of movement of arms 102 and 103. FIG. 17 illustrates the drive circuitry for caliper arm motor 113, the drive circuitry for motor 114 being identical. FIG. 18 is a schematic of the control circuitry for the circuit of FIG. 17, and comprises a pair of control bus lines B1 and B2 connectable to a suitable source of control voltage, not shown, with circuit elements therebetween. Motor 113 which drives lead screw 109 is controlled by a thyratron motor controller 128 of a type well known to those skilled in the art. Briefly stated, the motor controller may be a General Electric Company "Thymatrol" drive of a type comprising two thyratron tubes each having anode transformers, 129 and 130 and dependent upon which of the thyratrons is fired, motor 113 will either move caliper arm 102 toward the roll or toward a retracted position. Motor controller 128 may receive a control signal of fixed magnitude from a potentiometer 131 to advance the caliper arms, or from a potentiometer 132 to retract the caliper arms, both at speeds determined by the setting of the potentiometer arms and the magnitude of the control signals. When the caliper arm 102 is advanced to such a position that the caliper arm proximity switch LSL is closed, control of the motor is switched to the linear variable differential transformer networks to bring the caliper arms to a reference position.

Briefly stated, the output of each LVDT is a signal which is linearly proportional to displacement and direction of displacement from a neutral or null point. Linear variable differential transformers are well known in the art and as shown in FIG. 19 the LVDT's 119 and 119a on arms 102 and 103, respectively, each comprise a primary winding 134 excited from an alternating current source indicated by the reference numeral 135. Each LVDT further includes a pair of secondary windings 136 connected in series opposition and a movable magnetic core 137. The net voltage induced in the secondary windings varies inversely with the position of the core. The difference of the voltages generated in the secondary windings is indicative in magnitude and in phase of the physical displacement of the core from a neutral or null position. When the core is in a neutral or null position, the voltages induced in the secondary windings will be equal and opposite and therefore the net voltage thereacross will be zero. As the core is moved in one direction from the null position, the resultant output voltage in the secondary windings will increase while maintaining a certain phase difference between the voltage applied to the primary winding. As the core is moved in the opposite direction from a null position, the voltage will increase but the phase will differ by 180 degrees. A resultant displacement of position signal may be derived from discriminators or demodulators 138 and 138a which compare the magnitude and phase of the output voltage of the secondary windings against the reference voltage which is also the voltage applied to the primary windings. The output voltage of the discriminator is a uni-directional voltage varying in magnitude with the displacement of the core from the neutral or null position and of a polarity indicative of the direction of displacement. The outputs of the discriminators 138 and 138a are applied to associated amplifiers 139 and 139a, respectively. Each of the magnetic cores 137 is biased towards a displaced position by a spring or other resilient biasing means 140, and further has an object engaging probe 121. A suitable LVDT is one manufactured by Daytronic Corporation, Dayton, Ohio, Model 16SSB.

The arms 102 and 103 may be operated automatically as part of an overall function or under operator control. Manual control of arm 102 is here exemplified, it being understood that operation of arm 103 is identical and simultaneous.

Reference is now made to FIG. 18 which illustrates a control circuit comprising control bus lines B1 and B2, connectable to a suitable voltage source, not shown, and having control elements connected thereacross.

To bring arm 102 toward the roll, an enabling relay STC is energized by depressing push button switch STS. Relay STC picks up its contacts and energizes relay LC which closes its contacts in the armature circuit of motor 113. In FIGS. 17 and 18 relay coils and the contacts controlled thereby bear the same identifying reference. Then push button switch PBF is closed to energize relay MCA. Relay MCA picks up its contacts in line 128a and 128b and a forward control signal is applied to controller 128. This causes motor 113 to drive caliper arm 102 toward the roll. When the arm advances within a predetermined distance of the roll surface switch LSL is closed, and relay LVD is energized. Relay LVD then picks up its contact in line 142 and drops out its contacts in line 128a and 143 which then applies the control signal from amplifier 139 to motor controller 128. At the same time, timing relay TR1 is also connected across a source of voltage. As the arm now further approaches the roll under the control of the signal from amplifier 139 it will approach at an ever decreasing speed. As the core of LVDT 119 approaches a null position the signal from amplifier 139 will approach zero. From experience, it is known that the core of the LVDT 119 will reach a null position in a predetermined time.

Timing relay TR1 is selected to become energized and time out a predetermined time after switch LSL is closed, which predetermined time is sufficient to allow LVDT 119 to reach a null position. When timing relay TR1 times out it opens its contact TR1 to de-energize loop contactor relay LC. When relay LC is de-energized it opens its contacts in the armature circuit of motor 113 and prevents further operation of motor 113. Also, it opens its contact in series with relay LVD. Motor 113 is of a type which has an integral shaft brake controlled by an electromagnetic coil BC. The shaft brake is held off when the coil BC thereof is energized. However, if the brake coil BC is de-energized the brake is applied to the motor shaft, preventing further movement thereof. It will be noted that this is equivalent to applying a brake to lead screw 109 to hold it in a given position. At this time, caliper arm 102 has been brought to a predetermined position from the surface of the roll in which the LVDT thereon is in a null or neutral position and the signal from shaft encoder 115 is indicative of the distance from the surface of the roll to the center point 117 of track 101. It will be understood that while the motor control circuitry for only one arm has been shown, the control circuitry for motor 114 and arm 103 is identical, and caliper arms 102 and 103 are operated simultaneously. When it is desired to retract the arm pushbutton switch PBR may be depressed. When relay LC was de-energized it opened its contacts to de-energize relay LVD and relay MCA. When relay MCB is energized, it opens a contact to disable forward relay MCA and closes a contact to energize loop contactor relay LC and close lines 143 and 144. Loop contactor relay LC is energized picking up its contacts to close the motor armature circuit, prevent relay LVD from becoming energized, and allowing the reversing signal from potentiometer 132 to be applied to motor controller 128.

Motor 113 then retracts caliper arm 102. When caliper 102 opens switch LCB, relay MCB is de-energized and its contacts reset to their normal condition, this de-energizes relay LC, opens the LC loop contacts and sets the brake. The circuit of FIG. 18 is then disabled by opening switch STR.

In the manner just described, the machine operator may operate the caliper arms to null the LVDT's on a roll and subsequently withdraw the arms. As previously explained, the output of each of amplifiers 139 and 139a is applied to the motor drive for an associated caliper arm. Additionally, the outputs of amplifiers 139 and 139a may be summed in an adder 145 (FIG. 19). It will be appreciated, of course, that when both LVDT's are nulled, neither of amplifiers 139 or 139a will have an output signal other than zero magnitude. However, once the LVDT's are nulled, and the arms locked in place by the motor shaft brakes, the arms may then be moved along the length of the roll, and as the cores 137 thereof are moved by a change in diameter of the roll, the amplifiers 139 and 139a will yield a signal indicative of any such change in diameter.

In accordance with one aspect of the invention, the LVDT's together with the caliper structure may be utilized to record the contour of the roll. A strip chart recorder 146, FIG. 19, is provided which comprises a charting mechanism generally indicated by the reference numeral 147 which comprises a take-up roll 148 arranged to draw a strip chart 149 from a storage roll 150 beneath a pen or stylus 151. Take-up roll 148 is driven by a selsyn receiver unit 152 at a speed proportional to the rate of movement of carriage 14 along the length of the roll in a manner hereinafter explained. Pen 151, when activated, is displaced by pen motor 153 transversely of the direction of movement of strip 149 a distance proportional to the magnitude of a signal applied to pen motor 153. The signal applied to pen motor 153 is derived from comparator 154 which compares the magnitude of the output signal of adder 145, which tells the stylus how far to move and a feedback signal indicative of the distance the pen has moved. Therefore, the signal applied to pen motor 153 is a position error signal.

Let it be assumed that the caliper arms have been brought into the roll and nulled thereon and the carriage 14 is now traversed along the length of a roll which has a crown thereon. As the carriage is traversed along the length of the roll, the LVDT cores will be depressed and in response thereto each LVDT amplifier 139 and 139a will emit a unidirectional signal which is proportional to the magnitude of displacement of the LVDT cores. These signals are added by adder 145 and applied to comparator 154. Comparator 154 applies a signal to pen motor 153 which moves pen 151 transversely of strip 149 a distance proportional to the magnitude of the signal. As pen 151 is moved, a sliding contact 155 of a potentiometer 156 is moved a proportional distance. Sliding contact 155 of potentiometer 156 thus picks off a voltage signal which is proportional to the magnitude of displacement of pen 151 and this picked off signal is applied to comparator 154. As will be apparent if the signal from adder 145 increases the error signal from comparator 154 will increase and pen 151 will move further across strip 149. However, if the signal from adder 145 decreases the signal picked off potentiometer 156 will be greater and the error signal from comparator 154 will cause pen motor 153 to retract pen 151. In this manner, as the strip is moved beneath pen 151 and the pen 151 is moved into contact with the strip a plot of the contour of the roll will result. As will hereinafter more fully be described, movement of pen 151 also produces movement of a sliding contact 157 of a potentiometer 158. The signal picked off potentiometer 158 is then utilized to indicate the difference in roll diameter at two spaced-apart points on the roll, and is utilized in alignment of the axis of the roll with the ways 12 and 13, or otherwise stated, the path of travel of grinding wheel 27, as will hereinafter be described. When used in the alignment function pen 151 is not in contact with the strip chart.

The strip recorder 146 may be a General Electric Company single point potentiometer recorder, Model 8HF 1AO10252. In the recordation of roll contour function described above it will be understood, of course, that switches RCP, RSE and SEL will be closed. These switches may either be closed manually or may automatically be controlled as hereinafter described.

Reference is now made to FIGS. 20, 21 and 22. FIG. 20 exemplifies a worn mill roll, worn in the area W, as it may be initially placed on neck rests 17 and 18 in a misaligned condition. For purposes of illustration, the degree of misalignment of the axis of the roll with the path of travel T of grinding wheel 27 is exaggerated. In some cycles of a roll grinding operation, it is customary to initially rough-grind or clean up the roll while it is in the position in which it is initially placed on the grinding machine. This inherently results in a small taper on the roll face. One technique of rough-grinding, commonly referred to as "short-stroking" is exemplified in FIG. 21 wherein the grinding wheel 27 first strokes the roll from point HS to point M until the roll diameter is reduced a predetermined dimension or to the smallest diameter of the roll which in this case occurs at the point M. Then the grinding wheel 27 is caused to stroke the roll from the point FS to the point M to reduce that side of the roll face the same predetermined dimension or to the diameter at M. This results in a roll with a slight taper thereon as shown in FIG. 22. However, one side S of the roll is now aligned with the path T of travel of grinding wheel 27 and in such position the geometry and misalignment of the roll may be recognized by the machine. It will be obvious that with the roll in the position shown in FIG. 20 there is no reference line or point from which the degree of misalignment can be recognized. However, with one side of the roll S parallel to the line of travel T of the grinding wheel as shown in FIG. 22, a reference position of the roll is established and from this reference position the degree of misalignment may be determined as will hereinafter be described.

Alternative to the technique of aligning one side of the roll with the path of travel of the grinding wheel exemplified in FIGS. 20, 21 and 22, the roll may be initially aligned with one side thereof parallel to the path of travel T of the grinding wheel as disclosed and claimed in the co-pending application of Alfred T. Parrella, Serial No. 411,813, now Patent No. 3,333,370 dated August 1, 1967, the disclosure of which is incorporated herein by reference.

In this initial alignment step as exemplified in FIGS. 20–22, it will be understood, of course, that a roll having a crown thereon is ground with the crown contour superimposed on the path of travel of the grinding wheel utilizing the crowning mechanisms previously described in conjunction with FIGS. 7–10, in which case the path of travel T of the grinding wheel would not be a straight line but would be slightly curvilinear either convex or concave. Accordingly, the taper on the roll might have a slight convex or concave camber. However, for purposes of description the roll will be considered to be cylindrical and the path of travel of the grinding wheel will be considered to be linear.

Reference is now made to FIGS. 23 and 24. FIG. 23 illustrates a typical mill roll and is set forth to indicate the geometry thereof. The dimensions A and C, which will normally be equal, represent the distance from the end of the roll face to the center point of support of the roll journals, and the dimension B is the distance or length of the roll face.

FIG. 24 represents a mill roll which has been placed in the grinding machine and had one side S aligned as exemplified in FIG. 22. Such grinding as illustrated has resulted in a slight taper of the roll face along the length thereof. For purposes of explanation, this slight taper, and also the degree of misalignment of roll R1 in FIG. 24 have been exaggerated. In FIG. 24 the distances A, B, and C represent the same dimensions as set forth in FIG. 23. The axis of roll R1 is indicated by D′ and the line upon which the axis is to coincide or be aligned is indicated by D″, the axis D″ being parallel to the path of travel of the grinding wheel and ways 12 and 13. The roll is initially aligned as shown in FIG. 22, with ways 12 and 13 such that one side thereof S is parallel to ways 12 and 13. This places the roll in a position such that its geometry can be recognized with relation to the line of ways 12 and 13, or another reference line parallel thereto.

At this time gaging structure 100 is positioned such that the LVDT probes P are a distance $b$ from the headstock end HS of the roll face and arms 102 and 103 moved on track 101 until LVDT's 119 and 119a are nulled in contact with roll R1. At this time, the output of adder 145 is zero inasmuch as both inputs thereto are zero. Carriage 14 is then traversed along the length of roll R1 to a position such that the LVDT probes are a distance $b$ from the footstock end FS of the roll face. At this time, the cores of the LVDT's will be moved from the neutral position and the output signal from adder 145 will indicate the difference between diameters $d_1$ and $d_2$ and may be expressed as $$d_2 - d_1 = d_3 \quad (1)$$

It may be seen from an inspection of FIG. 24 that the right roll journal must be moved such that the center point of support moves from the line or axes D′ to line D″. Thus, the center point of support of the roll journal on neck rest 18 must be moved such that the axis of the roll moves the distance $d_4$. This distance, $d_4$, may be determined from the roll geometry and the proportional relationship of similar triangles. It may be seen that $$\frac{d_3}{B-2b} = \frac{d_4}{A+B+C} \quad (2)$$

and $$d_4 = d_3 \frac{(A+B+C)}{(B-2b)} \quad (3)$$

From the foregoing, it may be seen that the distance $d_4$ that neck rest 18 must move to align the axis of roll R with the path of travel of carriage 14 is a function of the roll geometry which is a constant. The difference in diameters $d_1$ and $d_2$ is expressed as a direct current signal by adder 145. The machine operator may observe the magnitude of the signal on meter 159, FIG. 19, in which it could be calibrated into fractions of an inch, and knowing the constant expressed in Equation 3 for a given roll or class of rolls, could determine the degree of movement of the footstock end of the roll necessary to align the axis of the roll with ways 12 and 13. However, in the preferred embodiment of the invention the signal from adder 145 reflecting the combined outputs of LVDT amplifiers 139 and 139a is applied to comparator 154, FIG. 19. With the pen 151 out of contact with strip 149 the signal is then utilized to drive pen motor and pen 151 as previously explained to set contact 157 of potentiometer 158 on the potentiometer in a position such that the signal picked off therefrom is proportional to the diameter difference $d_3$ (Equation 1). This signal is then applied to a servo system 160 which controls the operation of neck rest motor MN.

Servo system 160 comprises an operational amplifier which is utilized as a multiplier 161, neck rest motor MN, tachometer generator 61 which provides a voltage signal proportional to the speed of operation of neck rest motor MN, an integrator 162 which converts the tachometer velocity signal to a position signal, and a comparator 163 which receives an input signal from multiplier 161 and integrator 162, and in turn furnishes a position error signal to an amplifier 164 proportional to the difference between the input signals. The output signal of amplifier 164 then drives neck rest motor MN a distance and in a direction to align the axis of roll R1 along line D″, FIG. 24.

Multiplier 161 has a gain which is determined by the ratio of the resistances 165 and 166. This gain may be preset by varying the value of resistance 166. Resistance 166 may be a potentiometer having an indicator and calibrated scale for a range of values of the roll geometry constant $$\frac{A+B+C}{B-2b}$$

In operation, when switch MNS is closed, the voltage picked off potentiometer 158 is applied to multiplier 161 where it is multiplied by the predetermined roll geometry factor. In response to this signal, neck rest motor MN is operated to drive the movable elements of neck rest 18, and tachometer 61 generates a voltage proportional to the velocity of movement. Integrator 162 then converts this velocity signal to a position or distance signal and this signal is then compared with the output signal of multiplier 161 in comparator 163. The result of this comparison provides a position error signal which through amplifier 164 drives neck rest motor MN until the misalignment error is eliminated. At this time, the axis of roll R1 is aligned parallel to the path of travel of carriage 14 and the axis of rotation of the headstock. From the foregoing it may be seen that the drive for neck rest motor MN is a conventional positional servo system. If desired, the tachometer 61 and integrator 162 could be replaced by a device such as a potentiometer or slide wire which would yield a signal indicative of the position of the movable elements of neck rest 18, which signal could then be applied to comparator 163 together with the output of multiplier 161.

Reference is now made to FIG. 25 which illustrates in block form proximity detectors which are utilized to detect the ends of the roll face of a roll R2 and aid in positioning the LVDT's on each arm a distance from the end of the roll face. A proximity detector 167 generally comprises an oscillator 168 having a rigid coil 169 which forms part of the oscillatory tank circuit. The coil 169 is carried on the upper caliper arm 103 and the bottom plane 170 thereof when in proximity to the surface of roll R2, creates eddy currents in the roll which load the coil and decrease the amplitude of oscillations of oscillator 168. A detector 171 detects this decrease in the amplitude of oscillation and in response thereto actuates a relay PSH which closes its contact. When the coil 169 moves beyond the edge of the roll, the amplitude of oscillations of oscillator 168 return to their normal magnitude and relay PSH is de-energized.

A similar proximity detector 172 comprising a coil 173, oscillator 174, detector 175, relay PSF with two controlled contacts PSF and PSF′ is carried on lower caliper arm 102. The ends of coils 169 and 173 are offset equal distances from the probes P of LVDT's 119 and 119a as exemplified in FIG. 26 which diagrammatically illustrates the faces of gaging heads 118 and the relative locations of the LVDT probes, limit switches and proximity detecting coils thereon. As illustrated, coil 169 is displaced to one side of the center line of the probes P of the LVDT's by a distance $b_1$, while coil 173 is displaced to the other side of the center line of probes P by the same distance. Therefore, the coils 169 and 173 are positioned on caliper arms 102 and 103 in such manner that as the caliper structure 100 moves toward the headstock, proximity detector 167 will detect the end of the roll face. Then the LVDT on arm 103 may be positioned a predetermined distance from the end of the roll face. Similarly, when caliper structure 100 moves toward the footstock, proximity detector 172 will detect the other end of the roll face. A suitable proximity detector or limit switch of the type described is the General Electric Company CR115D Proximity Limit Switch.

In accordance with another aspect of the invention, new and improved means are provided for effecting an automatic alignment function utilizing the caliper structure 100. Reference is now made to FIGS. 27a and 27b, which illustrate schematically the circuit of carriage motor MC and the logic and control circuitry for automatically performing an alignment function. FIG. 27b is a continuation of FIG. 27a.

The control and logic circuitry of FIGS. 27a and 27b include a transformer TRX which produces a control voltage between control bus lines B3 and B4, and B5 and B4, which have a plurality of parallel circuit lines therebetween. The lines between bus lines B3, B4 and B4, B5 are identified by the reference letter L followed by a numeral. In FIGS. 27a and 27b various relay coils and the contacts controlled thereby are indicated by the same reference. While the logical functions of the various relays will be apparent from the succeeding description, the function of certain relays and limit switches is now pointed out.

Trip switches TSCH and TSCH' sense the position of the carriage and caliper structure relative to the headstock end of the roll face. Contacts PSH, PSF and PSF' are operated in response to the caliper LVDT's being positioned the predetermined distance $b_1$ from the edges of the roll face as explained in conjunction with FIGS. 25, 26a and 26b. The contacts TR1 in line L17 are closed when both LVDT's are in a nulled position and may be under the control of timing relay TR1 of FIG. 18. Relay RCP, line L21, may be utilized to control switches RCP in FIG. 19 to apply the outputs of both of amplifiers 139 and 139a to adder 145. Relay RSE, line L22, when energized closes switches RSE, FIG. 17 to enable operation of the strip chart recorder 146. Relays MCA and MCB, lines L29 and L31, respectively, correspond to the relays of the same designation in FIG. 18 and upon energization thereof control the operation of the caliper arm motor drives, FIG. 17, in the same manner as explained in conjunction with the description of FIG. 18. Switch BX, line L8, when closed initiates the alignment function by energizing relay MPC, line L9, and energization of relay MEN, line L37, terminates the alignment function. The function of the other elements of FIGS. 27a and 27b will be described or made apparent as the description of these circuits progresses.

To initiate the alignment function switch BX, line L8, is closed. This immediately energizes relay MPC, line L9. Assume now that the carriage is located such that the caliper is intermediate the ends HS and FS of the roll, FIG. 25, in which case switch TSCH, line L2, is closed and switch TSCH', line L3, is opened. Switch TSCH is arranged to close when the caliper is to the footstock side of point HS. Switch TSCH's is arranged to close when the caliper is to the headstock side of point HS. Relay MPC picks up its contact in line L11, and relay MAH, line L2, picks up its contact in line L11 to energize relay MCR. The function of relay MCR, upon energization thereof, is to move the carriage towards the headstock until the caliper structure is generally located in a predetermined position with respect to the end HS of the roll face. Relay MCR picks up its contact in line L34 and energizes contactor MCTR which in turn picks up its contacts in the line to motor MC and the motor drives the carriage towards the headstock end of the machine. As the caliper moves past point HS, switch TSCH', line L3 is closed and switch TSCH, line L2 is opened. Relay MAH, line L2, is de-energized and opens its contact in line L11. This de-energizes relay MCR and halts carriage drive motor MC. When switch TSCH is closed, relay MBH, line L3, is energized and picks up its contacts in line L12 to energize relay MPR.

When relay MPR is energized it signifies that the caliper is just off the headstock end of the roll face and enables lines L14 through L18. When the MPR and MBH contacts in line L14 close relay MCL is energizes. This signifies that carriage 14 may now be moved toward the footstock to position the caliper over the roll near point HS. Relay MCL picks up its contact in line L32 and energizes motor contactor MCTL which then energizes motor MC and the carriage commences moving toward the footstock. As the caliper passes point HS the position of switches TSCH and TSCH' reverse. Relay MBH contacts in line L14 close relay MCL is energized. is energized. Relay MAH picks up its contact in line L15 to energize relay MRK which latches itself in through its contact in line L16. When relay MRK is energized, it enables the caliper arms to be advanced toward the roll. When the caliper passed point HS and switch TSCH' opened, relay MBH, line L3 was de-energized and dropped out its contact in line L14 to de-energize relay MCL and interrupt power to motor MC. At this time, the caliper is positioned over the roll just inside point HS and the caliper arms are advancing toward the roll.

As the caliper arms leave their retracted position and advance toward the roll, switches LCB and LCU, line L7 (also FIGS. 11 and 18) which are open with the arms in a retracted position, are closed and relay MGR is energized. Now, as the caliper arms are brought in towards the roll and the LVDT's nulled, the contacts TR1, line L17, are closed when the nulling timers exemplified by timing relay TR1, FIG. 18, time out. Then relay MHP, line L17, is energized, and opens its contact in line L14 to disable relay MCL.

As the caliper arms approached a null position, proximity detector 167 on arm 103, through its coil 169 (FIG. 25) detected the roll surface beneath its coil and relay PSH closed its contact PSH in line L4 to energize relay MRH. The MRH and MHP contacts in line L35 are closed and relay MCTR energized to cause motor MC to drive the carriage and caliper toward the headstock end of the roll face. This motion of the carriage is occurring while the LVDT's are seeking or "hunting for" a null position.

As proximity detector coil 169 moves off the edge of the roll, relay PSH is de-energized opening contact PSH and de-energizing relay MRH, which in turn opens its contact in line L35 and de-energizes motor relay MCTR stopping motor MC. At the same time, the MRH and MHR contacts in line L19 were closed to energize timing relay PRT which, after timing out and becoming energized, picks up its contact PCRT in line L21. This time delay is partly co-extensive with the time delay of relay TR1, FIG. 18. At this time the caliper is so positioned with respect to the headstock end of the roll face that the probe 141 of the LVDT's on arm 103 is a distance $b_1$, FIG. 26a, from the end of the roll face.

After this time delay, relay RCP, line L21, is energized to enable adder 145 to combine the signals from the LVDT amplifiers 139 and 139a. Also, relay RSE, line L22, is energized to enable the strip chart recorder 146, FIG. 19. Now, all the contacts in line L23 are picked up by their respective relays and relay MTP is energized, and picks up its contact in line L33 to energize relay MCTL in line L32. When energized relay MCTL picks up its contacts in line with carriage motor MC and starts carriage motor MC traversing towards the footstock. As the caliper moves along the length of the roll face any change in diameter of the roll moves the cores of LVDT's 119 and 119a resulting in movement of pen 151 and potentiometer contacts 155 and 157, FIG. 19. When the caliper reaches the footstock end of the roll face and proximity detector coil 173 goes off the edge of the roll face, relay PSF (FIG. 25) is de-energized and closes its contact PSF in line L6 to energize relay MOF. Also PSF contact in line L5 is opened and relay MRF is de-energized. Relay MOF then drops out its contact in line L33 and de-energizes relay MCTL in line L32 to halt operation of motor MC and stop the carriage. At the same time the MRF contact in line L23 is dropped out and de-energizes relay MTP. Now the carriage is moved until the probes of the LVDT's are a distance $b_1$ from FS. Relay MTP drops out its contact in line L33. The proximity detector coil 173 is now beyond the end of the roll face. When relay MOF was energized it picked up its contact in line L24 to energize relay ASM which locks itself in by its contact in line L25. Relay ASM also picks up its contact in lines L26 and L36. When relay ASM picks up its contact in line L36, it energizes relay MCTR and the carriage commences to move in the direction of the headstock, until proximity switch coil 173 is back over the roll. Then relay PSF is de-energized, the PSF contact, line L5, is closed and PSF', line L6, is opened. This energizes relay MRF and de-energizes relay MOF. Relay MRF picks up its contact in line L26 to energize relay AMT and picks up its MRF contact in line L23 to energize relay MTP. When relay AMT is energized it enables movement of the carriage until coil 173 is just off the roll face and the LVDT probes a distance $b_1$ from FS. Relay ASM became de-energized when coil 173 moved back over the roll and opened its contact in line L36 to de-energize motor contactor MCTR. With contacts MOF and MTP in line L33 closed contactor MCTL is energized and motor MC moves the carriage until coil 173 goes off the roll. Then relay PSF is de-energized. Relay PSH then closes its PSF' contact in line L6 to energize relay MOF and open line L33 to de-energize motor contactor MCTL and disable motor MC. Relay MOF opens its contact in line L33 to de-energize relay MCTL. Movement of the carriage is now halted with the caliper LVDT's the desired predetermined distance $b_1$ from the footstock end of the roll face.

When relay AMT was energized it picked up its contacts in line L27 to enable relay ABT which became energized when relay MOF closed its contact in line L27 when the end of the roll was last detected. When relay ABT is energized, this stops the "hunting" movement of the caliper with the proximity detector coil 173 just off the edge of the roll. Also, relay ABT picks up its contacts in line L37 and line L30. This energizes relay MCB, line L29 (also FIG. 18) which causes the caliper arms to retract from the roll towards a retracted position. Relay MEN, line L37 when energized, opens its contact in line L9 to de-energize relay MPC and end the alignment cycle as described above.

At this time, the difference in diameters between the headstock and footstock calipering points has been recorded on potentiometer 158, FIG. 19. This signal is applied to the neck rest motor servo system by closing switch MNS which may be a MEN relay contact. As previously described, the neck rest motor is then operated to align the axis of the roll with ways 12 and 13 and the path of the grinding wheel. In the foregoing description of the circuitry of FIGS. 27a and 27b in some cases specific relay control contacts have not been discussed inasmuch as their operation is apparent from the foregoing discussion and the schematic diagram.

After the roll has been aligned, and the grinding operations performed thereon, the circuitry described above may be utilized to measure the diameter of the roll at the calipering points and also to operate the strip recorder 146, FIG. 19, as the caliper moves along the length of the roll and record the contour of the roll.

The diameter of the roll face may be measured at any point along the length thereof by bringing the caliper arms in until the LVDT's thereon are in a nulled position. Then the readout device 125, FIG. 16, is actuated to point out the diameter as determined by shaft encoders 115 and 116 by closing switches 125a. The diameter measurements may be made at the points adjacent the roll face ends predetermined by proximity detectors 167 and 172.

After the roll has been aligned and ground to its new dimensions and/or shape, the contour thereof may be automatically measured and recorded on the strip chart. This may be done automatically as described in conjunction with the roll axis alignment function, with the following changes:

When timing relay PRCT times out switch SEL is closed and the pen 151 is moved into marking engagement with strip chart 149. Also, switch MNS is opened to disable the neck rest motor servo system.

As carriage 14 moves along the length of the roll, gear 176 and shaft 177 (FIG. 28) are driven by rack 32 on base 11. Shaft 176 through bevel gears 178 and 179 drives shaft 180 which in turn drives a selsyn transmitter 181. Selsyn transmitter 181 in turn energizes selsyn receiver 152, and the chart 149 is moved at a speed proportional to movement of carriage 14 along ways 12 and 13. This results in an accurate recordation of the contour of the roll. The roll diameter may be printed or otherwise recorded at the beginning and end of the contour measuring function. During the function of roll contour measuring and recording, pen 151 is lifted from strip chart 149 as coil 173 detects the footstock edge of the roll.

It is understood that while the roll surface sensing elements have been exemplified as linear variable differential transformers, other gaging means may be used instead.

FIG. 28 also illustrates the manner in which the position of the grinding wheel and caliper relative to the roll may be determined. Shaft 180 carries thereon a switch actuating block 180a in the form of a traveling nut movable in guide 182. The position of block 180a along the length of shaft 180 is determined by the position of the carriage along ways 12 and 13. The caliper structure 100 carries switch locating shafts 183 and 184, each of which may move in guides 185 and 186, traveling nuts carrying switches indicated as TSF, TSH and TSCH which are actuated by switch block 180a. The switches may be positioned on the shafts 183 and 184 in accordance with the dimensions of a roll mounted in the grinding apparatus. In practice, the switch TSH is set in a position corresponding to the headstock end of the roll face and the switch TSF is set to a position corresponding to the footstock end of the roll face. All switching positions are then referred to the center line of grinding wheel 27. Therefore, switch TSCH on shaft 184 is positioned a distance from switch TSH corresponding to the distance between the center line of grinding wheel 27 and the center line of the LVDT probes on the caliper. The switches TSF and TSH are here set forth merely for purposes of orientation inasmuch as it is the switch TSCH and its ganged contact TSCH' which are of prime importance in the invention herein disclosed.

It will be apparent that the caliper structure may also be utilized to detect the regions of greatest wear of a roll when it is placed on the grinding machine. This may be accomplished in the same manner as recording the contour. Alternatively, the arms could be brought in and the LVDT's nulled at one end of the roll. Then the operator would traverse carriage 14 along the roll while noting any deflection of meter 159.

It may thus be seen that the objects of the invention set forth as well as those made apparent from the preceding description are efficiently attained through the provision of a caliper structure mounted on the grinding wheel carriage which performs or enables the performance of a plurality of operations on a roll mounted in the grinding apparatus.

While a preferred embodiment of the invention has been set forth for purposes of disclosure, other embodiments of the invention as well as modifications to the disclosed embodiments may occur to those skilled in the art which do not depart from the spirit and scope of the invention. It is, therefore, intended in the appended claims to cover all embodiments of the invention, as well as modifications to the disclosed embodiments of the invention which do not depart from the spirit and scope of the invention.

What is claimed is:

1. In a roll grinder having means for rotatably supporting a roll, a headstock for rotatably driving a roll about a rotative axis, and a carriage movable parallel to said axis; a caliper-like structure on said carriage comprising a rigid frame member supporting a guiding track thereon which extends at an acute angle to the horizontal at least partially over a roll on the support means, a pair of arms on said track extending substantially perpendicular thereto, said arms being movable between retracted positions at the ends of said track to a roll gaging position, sensing means on each of said arms for indicating when its arm is in a predetermined position with respect to a roll, drive means for moving each of said arms on said track, each of said sensing means upon sensing the surface of a roll being effective to emit a signal which controls the operation of an associated one of said drive means to place said arms in said predetermined positions, and means for disabling said drive means when said arms are positioned in said predetermined position.

2. In a roll grinder having means for rotatably supporting a roll, a headstock for rotatably driving a roll about a rotative axis, and a carriage movable parallel to said axis; a caliper-like structure on said carriage comprising a rigid frame member supporting a guiding track thereon which extends at an acute angle to the horizontal at least partially over a roll on the support means, a pair of arms on said track extending substantially perpendicular thereto, said arms being movable between retracted positions at the ends of said track to a roll gaging position, sensing means on each of said arms for indicating when its arm is in a predetermined position with respect to a roll, drive means for moving each of said arms on said track, each of said sensing means upon sensing the surface of a roll being effective to emit a signal which controls the operation of an associated one of said drive means to place said arms in said predetermined positions, means for disabling said drive means when said arms are positioned in said predetermined positions, and means coupled to each of said drive means for indicating the position of the associated arm from a predetermined point.

3. In a roll grinder having means for rotatably supporting a roll, a headstock for rotatably driving a roll about a rotative axis, and a carriage movable parallel to said axis; a caliper-like structure on said carriage comprising a rigid frame member supporting a guiding track thereon which extends at an acute angle to the horizontal at least partially over a roll on the support means, a pair of arms on said track extending substantially perpendicular thereto, said arms being movable between retracted positions at the ends of said track to a roll gaging position, sensing means on each of said arms for indicating when its arm is in a predetermined position with respect to a roll, drive means for moving each of said arms on said track, each of said sensing means upon sensing the surface of a roll being effective to emit a signal which controls the operation of an associated one of said drive means to place said arms in said predetermined positions, mean for disabling said drive means when said arms are positioned in said predetermined positions, means for moving said carriage along the roll face from one end to the other, and means responsive to movement of said carriage along the roll face for continuously recording the magnitude of the signals emitted from said sensing means.

4. In a roll grinder having means for rotatably supporting a roll, a headstock for rotatably driving a roll about a rotative axis, and a carriage movable parallel to said axis; a caliper-like structure on said carriage comprising a rigid frame member supporting a guiding track thereon which extends at an acute angle to the horizontal at least partially over a roll on the support means, a pair of arms on said track extending substantially perpendicular thereto, said arms being movable between retracted positions at the ends of said track to a roll gaging position, sensing means on each of said arms for indicating when its arm is in a predetermined position with respect to a roll, drive means for moving each of said arms on said track, said sensing means upon sensing the surface of a roll being effective to emit a signal which controls the operation of an associated one of said drive means to place said arms in said predetermined positions, means for disabling said drive means when said arms are positioned in said predetermined positions, means for aligning one side of a roll with the axis, means for positioning said arms and said sensing means a predetermined position from one end of the roll face, means for moving said carriage along the length of the roll face to position said arms and said sensing means the same predetermined distance from the other end of the roll face, means for detecting the magnitude of the signals from said sensing means at the predetermined position at said other end of the roll, and means responsive to the magnitude of the detected signals for moving said support means at one end of the roll in a direction transversely of the reference axis so as to align the axis of said roll with the rotative axis.

5. Roll grinding apparatus comprising spaced apart journal rests for rotatably supporting a roll, a carriage movable along the length of a roll on said rests, first and second roll gaging heads on said carriage movable toward and away from each other, said heads being arranged to receive a roll therebetween, each of said heads carrying first and second roll surface sensing means respectively adapted to position its head in a predetermined position from the surface of a roll, first and second drive means for moving said first and second heads respectively, each of said roll surface sensing means being arranged to disable the drive means for its associated head when the head is in a predetermined position with respect to a roll on said rests.

6. The roll grinding apparatus of claim 5 further including a headstock for rotatably driving a roll about a rotative axis, each of said roll sensing means residing on a line intersecting said rotative axis.

7. The roll grinding apparatus of claim 5 further including means responsive to the distance moved by each of said gage heads from retracted positions to said predetermined positions for indicating the dimension of the roll between said gage heads.

8. Grinding apparatus comprising means for rotatably supporting a roll, a headstock for rotatably driving a roll about a rotative axis, a carriage movable parallel to said axis, a grinding wheel on said carriage, guide means on said carriage extending transversely of said axis at an acute angle with respect to the horizontal and at least partially overlying a roll on said support means, a pair of arms mounted on said guide means independently movable toward and away from each other, each of said arms carrying thereon means adapted to detect the surface of a roll when said arms are a predetermined distance from the roll, the center line of each of said gaging means being coincident and intersecting said axis.

9. In a roll grinder having first and second roll journal supports adapted to rotatably support a mill roll thereon, and carriage means movable along the length of a roll thereon, one of said journal supports including adjusting means operative to move a journal thereon toward and away from the path of travel of the carriage; means for aligning one side of a roll with the path of travel of the carriage, means on said carriage for gaging the diameter of a roll a predetermined distance from one end of the face thereof and for gaging the diameter of the roll the same predetermined distance from the other end thereof, means for detecting the difference in said diameters, and means responsive to said means for detecting for producing movement of the adjusting means to move one end of the roll a distance proportional to the magnitude of said indication in a direction transverse of the axis of the roll.

10. In a roll grinder having a grinding wheel, first and second roll journal supports adapted to rotatably support a mill roll thereon, and carriage means movable along the length of a roll thereon, one of said journal supports including adjusting means operative to move a journal thereon toward and away from the path of travel of the carriage, means on said carriage for gaging the diameter of a roll a predetermined distance from one end of the face thereof and for gaging the diameter of the roll the same predetermined distance from the other end thereof, means for detecting the difference in said diameters, and means responsive to said means for detecting for producing movement of the adjusting means to move one end of the roll a distance proportional to the magnitude of said indication.

11. In a roll grinder having a grinding wheel, first and second roll journal supports adapted to rotatably support a mill roll thereon, and carriage means adapted to move the grinding wheel along the length of the roll, one of said journal supports including adjusting means operative to move a journal thereon toward and away from the path of travel of the carriage; means for aligning one side of a roll with the path of travel of the carriage, means on said carriage for gaging the diameter of a roll at one end of the face thereof and for gaging the diameter at the other end thereof, means for detecting the difference in said diameters, and means responsive to said means for detecting for producing movement of the adjusting means to move one end of the roll a distance proportional to the magnitude of said indication.

12. The invention of claim 11 wherein said means for gaging the diameter of the roll comprises a rigid structure mounted on said carriage and providing linear guide means overlying at least a portion of the roll, a pair of arms on said guide means movable towards and away from each other, each of said arms carrying thereon roll surface sensing means adapted to position said arms in a predetermined position from a roll therebetween, means for advancing said arms toward a roll therebetween and positioning said arms a predetermined distance from one edge of the roll face, and means for moving said carriage along the length of the roll until the arms are the same predetermined distance from the other end of the roll.

13. The invention of claim 12 wherein said means on said arms emit a signal of predetermined magnitude when the arms are positioned a preselected distance from the roll and emit a signal proportional to change in dimension of the roll between the arms when said carriage is moved to a different position along the length of the roll.

14. Roll grinding apparatus comprising means for rotatably supporting a roll, a headstock for rotatably driving a roll about a reference axis, a carriage movable parallel to said axis, roll measuring means on said carriage, comprising a pair of arms independently movable toward and away from each other, said arms being arranged to receive a roll therebetween, each of said arms carrying gaging means adapted to position its arm in predetermined relationship from the surface of a roll on opposite sides thereof, said gaging means being effective to emit a signal indicative of change of dimension of the roll therebetween, means for moving said carriage along the length of the roll, recording means including a recording medium movable at a speed proportional to the speed of movement of said carriage, and means responsive to the signal of said gaging means for recording the magnitude of said signals on said recording medium.

15. Roll grinding apparatus comprising first and second spaced apart means for rotatably supporting a roll therebetween, a movable carriage, roll gaging means on said carriage including roll surface sensing means positionable on opposite sides of a roll on said support means, said sensing means being adapted to emit a signal proportional to a change in dimension of the roll between said sensing means, and means for moving said carriage in a linear path along the length of the roll on said support means.

16. The apparatus of claim 15 further including means for moving said carriage to sequentially position said sensing means at opposite ends of a roll face, and means for detecting a difference in dimension of the roll between opposite ends thereof.

17. The apparatus of claim 16 further including means responsive to a detected difference in roll diameter between opposite ends of the roll for moving one of said support means in a direction transverse the axis of the roll to move that end of the roll a distance proportional the magnitude of the detected difference.

18. The apparatus of claim 15 further including means for continuously indicating the dimension between said sensing means as said carriage moves along the face of a roll.

19. Roll grinding apparatus comprising first and second spaced apart means for rotatably supporting a roll therebetween, a carriage means for moving said carriage in a linear path along the length of a roll on said support means, roll gaging means on said carriage including a pair of arms independently movable toward and away from each other on opposite sides of a roll on said support means, a roll surface sensing means on each of said arms adapted to emit a signal proportional to the distance of its associated arm from the surface of the roll from a predetermined position of the arm, means for moving said arms to said predetermined positions where said sensing means are a preselected distance from one edge of the roll face, means responsive to said arms reaching said preselected distance for moving said carriage along the length of the roll to a position where the sensing means are the same preselected distance from the other end of the roll, means for detecting any difference in the magnitude of signals at said preselected distances and moving the support means at said other end of the roll in a direction transverse to the path of travel of said carriage a distance proportional to the magnitude of the signal difference.

20. Roll grinding apparatus comprising first and second spaced apart means for rotatably supporting a roll therebetween, a carriage, means for moving said carriage in a linear path along the length of a roll on said support means, roll gaging means on said carriage including a pair of arms independently movable toward and away from each other on opposite sides of a roll on said support means, a roll surface sensing means on each of said arms adapted to emit a signal proportional to the distance of its associated arm from the surface of the roll from a predetermined position of the arm, means for moving said arms to said predetermined positions where said sensing means are a preselected distance from one edge of the roll face, means responsive to said arms reaching said preselected distance for moving said carriage along the length of the roll to position said sensing means the same preselected distance from the other edge of the roll face.

21. Roll grinding apparatus comprising journal rests for rotatably supporting a roll, a carriage movable parallel to said axis, a grinding wheel on said carriage, roll measuring means on said carriage comprising a pair of arms independently movable toward and away from each other, said arms being arranged to receive a roll therebetween, each of said arms carrying roll surface sensing means adapted to position its arm in a predetermined position from the surface of a roll, independent drive means for simultaneously moving each of said arms into said predetermined positions with the roll, each of said roll surface sensing means being arranged to disable the drive means for its associated arm when said arms are in said predetermined positions.

22. Roll grinding apparatus comprising journal rests for rotatably supporting a roll, a carriage, said carriage being movable along the length of a roll on said journal rests, a grinding wheel and roll gaging means on said carriage including a pair of gaging heads linearly movable toward and away from each other, each of said heads carrying roll surface sensing means adapted to contact a roll between said heads on substantially diametrically opposite sides of a roll on said support means, independent drive means for each of said heads, each of said roll surface sensing means being arranged to disable the drive means for its associated gaging head when said heads are in a predetermined position with respect to the roll determined by said roll surface sensing means.

23. Roll grinding apparatus comprising journal rests for rotatably supporting a roll, a carriage, said carriage being movable along the length of the roll on said journal rests, a grinding wheel, and roll gaging means on said carriage, said gaging means including a pair of gaging heads movable toward and away from each other, each of said heads carrying gaging means adapted to contact a roll between said heads, and an arm on said carriage extending essentially perpendicular to the axis of a supported roll, said gaging heads being movably mounted to said arm.

24. The apparatus of claim 23 further including means for moving said heads, and means for halting movement of said heads when said heads are in a predetermined position with respect to a roll.

25. The apparatus of claim 23 wherein each of said heads has a retracted position, and means responsive to movement of said heads from said retracted positions to said predetermined positions for indicating the dimension of a roll therebetween.

26. The apparatus of claim 23 further including means for rotatively driving a roll about a rotative axis and said gaging means have coincident center lines essentially intersecting said axis of rotation.

27. Roll grinding apparatus comprising first and second spaced apart support means for rotatably supporting a roll therebetween, a carriage, means for moving said carriage in a linear path along the length of a roll on said support means, an arm on said carriage extending across a roll on said support means and a pair of roll gaging means linearly movable on said arm, said roll gaging means including roll surface sensing means positionable on substantially diametrically opposite sides of a roll on said support means.

28. The apparatus of claim 27 further including means responsive to said gaging means for detecting the diameter of a roll therebetween, and means responsive to a detected difference in diameter between opposite ends of a roll for moving said support means in a direction transverse to the axis of the roll to move an end of the roll a distance proportional to the magnitude of the detected difference.

29. The apparatus of claim 27 further including means responsive to said sensing means for indicating the diameter of a roll, means for moving said carriage to position said sensing means at opposite ends of a roll, and means for detecting a difference in dimension of the roll between opposite ends thereof.

30. A roll grinding machine comprising a base having a set of wheel head carriage ways thereon, a wheel head carriage slidably received on said ways for movement therealong, journal rests for supporting a roll in a grinding operation and including means for adjusting the roll position for alignment thereof parallel to said ways, a gage arm carried on said wheel head, a set of gage heads carried by said gage arm on opposite sides of a roll on said journal rests and movable along paths radiating from a common center, means for simultaneously moving said gage heads along the radial paths toward and away from said common center, and deflectable means associated with each of said gage heads for indicating contact with a roll supported by said journal rests when said gage heads are moved toward said common center.

31. Roll grinding apparatus comprising journal rests for rotatably supporting a roll, a headstock for rotatably driving a roll about a rotative axis, a carriage movable parallel to said axis, a grinding wheel on said carriage, roll measuring means on said carriage comprising a pair of arms independently movable toward and away from each other, said arms being arranged to receive a roll therebetween, each of said arms carrying a roll sensing means adapted to position its arm in a predetermined position from the surface of a roll, and independent means for simultaneously moving each of said arms into said predetermined positions with the roll, said roll sensing means each being effective to emit a signal indicative of a change in diameter of said roll when said arms are placed in said predetermined position and said carriage is moved along the length of the roll, means for moving the carriage along the length of the roll, recording means including a recording medium movable at a speed proportional to movement of said arms along the roll, and means for recording the magnitude of the combined signals on said recording medium as it moves at said proportional speed.

32. In a roll grinding machine, first and second roll journal rests adapted to rotatably support a roll thereon and a grinding wheel carriage movable along the length of a roll on said rests, one of said journal rests including adjusting means operative to move a journal thereon toward and away from the path of travel of the carriage, said machine being arranged to align one side of the roll with the path of travel of the carriage; means on said carriage for gaging a roll on said journal rests at opposite ends of the face thereof, means responsive to said gaging means for detecting the difference in diameters at opposite ends of the roll face, and means responsive to said detecting means for moving said adjusting means a distance proportional to the detected difference.

33. The apparatus of claim 32 further including means for positioning said gaging means a predetermined distance from each end of the roll face, said means responsive to said detecting means for moving said adjusting means being arranged to move one end of the roll transversely of the path of travel of the carriage a distance D where D is equal to $$d \times \frac{A+B+C}{B-2b}$$

where
A is the distance from the center of support of one journal to the end of the face portion adjacent thereto
B is the length of the face portion
C is the distance from the center of support of the other journal to the end of the face portion adjacent thereto
$d$ is the detected difference in diameters and
$b$ is the predetermined distance from the ends of the face portion of the roll to the points where the roll face was gaged.

References Cited

UNITED STATES PATENTS

| | | | |
|---|---|---|---|
| 972,196 | 10/1910 | Johnson | 33—148 |
| 1,792,043 | 2/1931 | Scusa | 33—172 |
| 2,689,409 | 9/1954 | Fry et al. | 33—178 |
| 2,984,953 | 5/1961 | Neal | 51—165 |
| 3,169,323 | 2/1965 | Hold | 33—147 |
| 1,808,392 | 6/1931 | Waldrich | 51—49 |
| 3,088,250 | 5/1963 | Hold et al. | 51—49 X |
| 3,089,293 | 5/1963 | Hoier et al. | 51—49 X |
| 3,263,374 | 8/1966 | Stuckey et al. | 51—49 X |
| 3,281,995 | 11/1966 | Parella et al. | 51—49 X |

LESTER M. SWINGLE, *Primary Examiner.*

UNITED STATES PATENT OFFICE
CERTIFICATE OF CORRECTION

Patent No. 3,391,497                                      July 9, 1968

Alfred T. Parrella et al.

It is certified that error appears in the above identified patent and that said Letters Patent are hereby corrected as shown below:

Column 14, line 3, "energizes" should read -- energized --; line 11, cancel "contacts in line L14 close relay MCL is energized." and insert --, line L3 is de-energized and relay MAH, line L2, --. Column 20, line 15, "carriage" should read -- carriage, --.

Signed and sealed this 6th day of January 1970.

(SEAL)
Attest:

Edward M. Fletcher, Jr.                          WILLIAM E. SCHUYLER, JR.
Attesting Officer                                         Commissioner of Patents